(12) United States Patent
Baghel et al.

(10) Patent No.: US 10,742,381 B2
(45) Date of Patent: Aug. 11, 2020

(54) TECHNIQUES FOR MULTIPLE HARQ TRANSMISSIONS

(71) Applicant: QUALCOMM Incorporated, San Diego, CA (US)

(72) Inventors: Sudhir Kumar Baghel, Hillsborough, NJ (US); Kapil Gulati, Dover, DE (US); Shailesh Patil, San Diego, CA (US); Tien Viet Nguyen, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/933,211

(22) Filed: Mar. 22, 2018

(65) Prior Publication Data

US 2018/0287763 A1 Oct. 4, 2018

Related U.S. Application Data

(60) Provisional application No. 62/480,221, filed on Mar. 31, 2017.

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1887* (2013.01); *H04W 28/04* (2013.01);
(Continued)

(58) Field of Classification Search
CPC ... H04L 5/0055; H04L 1/1812; H04L 1/1887; H04W 28/04; H04W 72/044
(Continued)

(56) References Cited

U.S. PATENT DOCUMENTS 9,730,174 B2  8/2017  Seo et al.
10,225,875 B2 * 3/2019  Seo .......................... H04W 4/70
(Continued)

FOREIGN PATENT DOCUMENTS

WO  2016010217 A1  1/2016
WO  2016122386 A2  8/2016

OTHER PUBLICATIONS

International Search Report and Written Opinion—PCT/US2018/023947—ISA/EPO—dated Aug. 29, 2018.
(Continued)

*Primary Examiner* — Yemane Mesfin
*Assistant Examiner* — Intekhaab A Siddiquee
(74) *Attorney, Agent, or Firm* — Loza & Loza LLP

(57) ABSTRACT

Various aspects of the disclosure relate to facilitating multiple hybrid automatic repeat request (HARQ) transmissions. For example, the teachings herein may be used for multiple HARQ transmissions in vehicle-to anything (V2X) communication or some other type of communication. The disclosure relates in some aspects to sending information indicative of the number of scheduling assignment (SA) symbols being sent by a device in conjunction with HARQ transmissions. The disclosure relates in some aspects to reserving resources for multiple HARQ transmissions and communicating an indication of the reserved HARQ resources.

23 Claims, 16 Drawing Sheets

(51) Int. Cl.
*H04W 28/04* (2009.01)
*H04W 72/04* (2009.01)

(52) U.S. Cl.
CPC ......... *H04W 72/044* (2013.01); *H04L 1/1812* (2013.01); *H04L 5/0007* (2013.01)

(58) Field of Classification Search
USPC ......................................................... 370/216
See application file for complete search history.

(56) References Cited

U.S. PATENT DOCUMENTS

| | | | |
|---|---|---|---|
| 2013/0188566 A1* | 7/2013 | Zhu | H04W 72/042 370/329 |
| 2015/0092721 A1* | 4/2015 | Papasakellariou | H04L 5/0007 370/329 |
| 2017/0290008 A1 | 10/2017 | Tooher et al. | |
| 2017/0295553 A1 | 10/2017 | Lee et al. | |
| 2017/0310425 A1 | 10/2017 | Chae et al. | |
| 2017/0359849 A1 | 12/2017 | Zhang et al. | |

OTHER PUBLICATIONS

Partial International Search Report—PCT/US2018/023947—ISA/EPO—dated Jul. 4, 2018.

\* cited by examiner

TECHNIQUES FOR MULTIPLE HARQ TRANSMISSIONS

CROSS-REFERENCE TO RELATED APPLICATION(S)

This application claims priority to and the benefit of provisional patent application No. 62/480,221 filed in the U.S. Patent and Trademark Office on Mar. 31, 2017, the entire content of which is incorporated herein by reference.

INTRODUCTION

Various aspects described herein relate to wireless communication and more particularly, but not exclusively, to facilitating multiple hybrid automatic repeat request (HARQ) transmissions.

Wireless communication networks are widely deployed to provide various communication services such as telephony, video, data, messaging, broadcasts, and so on. Such networks, which are usually multiple access networks, support communication for multiple users by sharing the available network resources.

In some scenarios, multiple HARQ transmissions may be used to achieve a desired level of communication performance (e.g., higher throughput, higher reliability, and so on). Use of a variable number of HARQ transmissions may affect the messaging and resource allocations for HARQ, thereby negatively affecting a receiver's ability to efficiently decode the HARQ transmissions. Thus, there is a need for effective techniques to facilitate the use of multiple HARQ transmissions.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method of communication including: determining a quantity of resource blocks to be used for an error correction operation; selecting a quantity of control information elements to be used for the error correction operation, wherein the selection is based on the determined quantity of resource blocks; sending information indicative of the selected quantity of resource blocks; and sending the selected quantity of control information elements.

In one aspect, the disclosure provides an apparatus for communication, including a memory and a processor coupled to the memory. The processor and the memory are configured to: determine a quantity of resource blocks to be used for an error correction operation; select a quantity of control information elements to be used for the error correction operation, wherein the selection is based on the determined quantity of resource blocks; send information indicative of the selected quantity of resource blocks; and send the selected quantity of control information elements.

In one aspect, the disclosure provides an apparatus configured for communication. The apparatus including: means for determining a quantity of resource blocks to be used for an error correction operation; means for selecting a quantity of control information elements to be used for the error correction operation, wherein the selection is based on the determined quantity of resource blocks; means for sending information indicative of the selected quantity of resource blocks; and means for sending the selected quantity of control information elements.

In one aspect, the disclosure provides a non-transitory computer-readable medium storing computer-executable code, including code to: determine a quantity of resource blocks to be used for an error correction operation; select a quantity of control information elements to be used for the error correction operation, wherein the selection is based on the determined quantity of resource blocks; send information indicative of the selected quantity of resource blocks; and send the selected quantity of control information elements.

In one aspect, the disclosure provides a method of communication including: receiving information indicative of a quantity of resource blocks to be received during an error correction operation; determining a quantity of control information elements to be received during the error correction operation, wherein the determination is based on the quantity of resource blocks; and receiving the determined quantity of control information elements.

In one aspect, the disclosure provides an apparatus for communication, including a memory and a processor coupled to the memory. The processor and the memory are configured to: receive information indicative of a quantity of resource blocks to be received during an error correction operation; determine a quantity of control information elements to be received during the error correction operation, wherein the determination is based on the quantity of resource blocks; and receive the determined quantity of control information elements.

In one aspect, the disclosure provides an apparatus configured for communication. The apparatus including: means for receiving information indicative of a quantity of resource blocks to be received during an error correction operation; means for determining a quantity of control information elements to be received during the error correction operation, wherein the determination is based on the quantity of resource blocks; and means for receiving the determined quantity of control information elements.

In one aspect, the disclosure provides a non-transitory computer-readable medium storing computer-executable code, including code to: receive information indicative of a quantity of resource blocks to be received during an error correction operation; determine a quantity of control information elements to be received during the error correction operation, wherein the determination is based on the quantity of resource blocks; and receive the determined quantity of control information elements.

In one aspect, the disclosure provides a method of communication including: determining a quantity of control information elements to be used for an error correction operation; selecting a resource contention sequence to use for the error correction operation, wherein the selection is based on the determined quantity of control information elements; and sending the resource contention sequence, wherein the resource contention sequence comprises an indication of a plurality of resource blocks used for the error correction operation.

In one aspect, the disclosure provides an apparatus for communication, including a memory and a processor coupled to the memory. The processor and the memory are configured to: determine a quantity of control information elements to be used for an error correction operation; select a resource contention sequence to use for the error correction operation, wherein the selection is based on the determined quantity of control information elements; and send the resource contention sequence, wherein the resource contention sequence comprises an indication of a plurality of resource blocks used for the error correction operation.

In one aspect, the disclosure provides an apparatus configured for communication. The apparatus including: means for determining a quantity of control information elements to be used for an error correction operation; means for selecting a resource contention sequence to use for the error correction operation, wherein the selection is based on the determined quantity of control information elements; and means for sending the resource contention sequence, wherein the resource contention sequence comprises an indication of a plurality of resource blocks used for the error correction operation.

In one aspect, the disclosure provides a non-transitory computer-readable medium storing computer-executable code, including code to: determine a quantity of control information elements to be used for an error correction operation; select a resource contention sequence to use for the error correction operation, wherein the selection is based on the determined quantity of control information elements; and send the resource contention sequence, wherein the resource contention sequence comprises an indication of a plurality of resource blocks used for the error correction operation.

In one aspect, the disclosure provides a method of communication including: receiving a resource contention sequence, wherein the resource contention sequence comprises an indication of a plurality of resource blocks to be received during an error correction operation; determining a quantity of control information elements to be received during the error correction operation, wherein the determination is based on the resource contention sequence; and receiving the determined quantity of control information elements.

In one aspect, the disclosure provides an apparatus for communication, including a memory and a processor coupled to the memory. The processor and the memory are configured to: receive a resource contention sequence, wherein the resource contention sequence comprises an indication of a plurality of resource blocks to be received during an error correction operation; determine a quantity of control information elements to be received during the error correction operation, wherein the determination is based on the resource contention sequence; and receive the determined quantity of control information elements.

In one aspect, the disclosure provides an apparatus configured for communication. The apparatus including: means for receiving a resource contention sequence, wherein the resource contention sequence comprises an indication of a plurality of resource blocks to be received during an error correction operation; means for determining a quantity of control information elements to be received during the error correction operation, wherein the determination is based on the resource contention sequence; and means for receiving the determined quantity of control information elements.

In one aspect, the disclosure provides a non-transitory computer-readable medium storing computer-executable code, including code to: receive a resource contention sequence, wherein the resource contention sequence comprises an indication of a plurality of resource blocks to be received during an error correction operation; determine a quantity of control information elements to be received during the error correction operation, wherein the determination is based on the resource contention sequence; and receive the determined quantity of control information elements.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
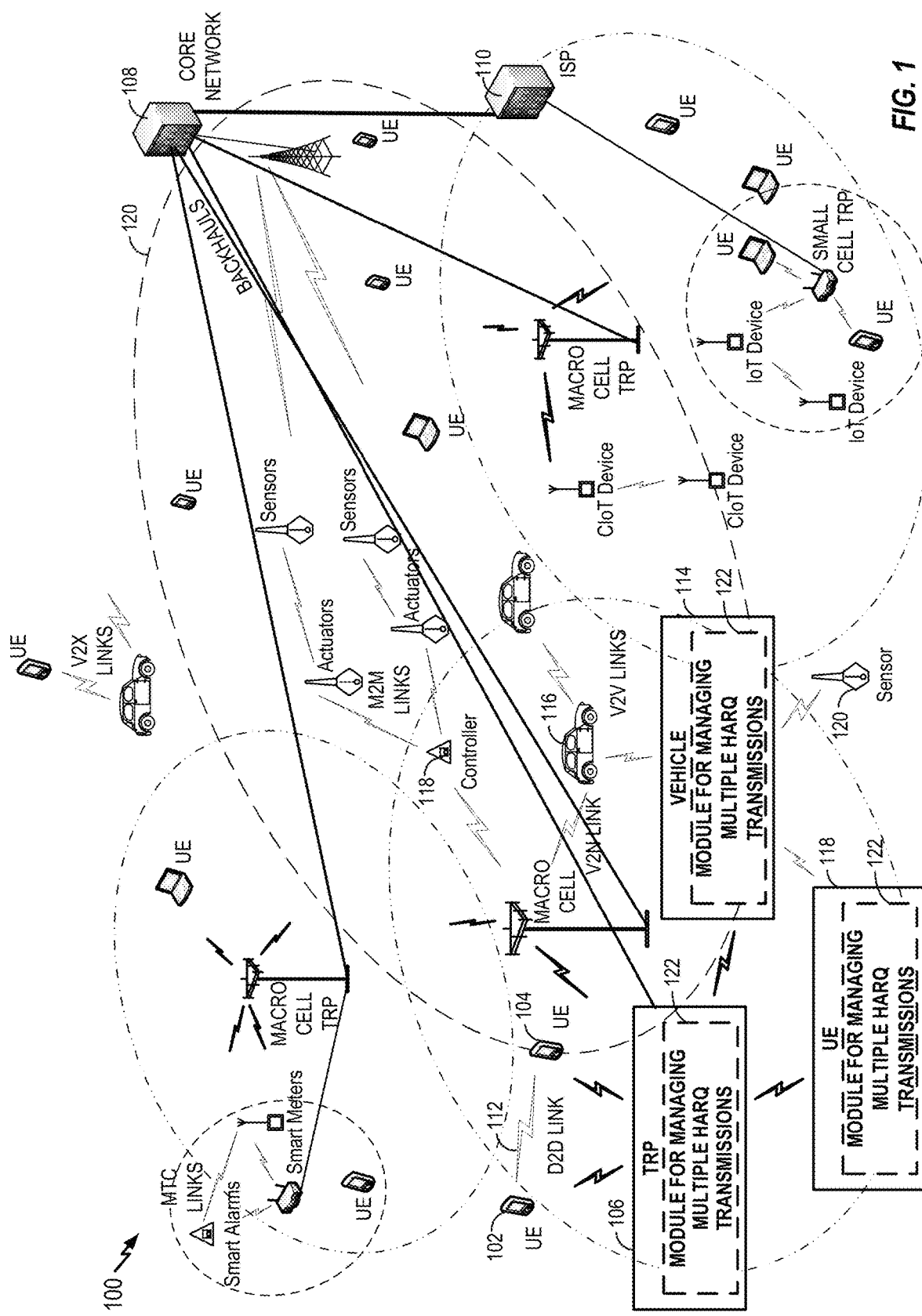
FIG. 1 is a diagram of an example communication system in which aspects of the disclosure may be used.

Various aspects of the disclosure relate to facilitating multiple hybrid automatic repeat request (HARQ) transmissions. For example, the teachings herein may be used for multiple HARQ transmissions in vehicle-to anything (V2X) communication or some other type of communication. The disclosure relates in some aspects to sending information indicative of the number of scheduling assignment (SA) symbols being sent by a device in conjunction with HARQ transmissions. For example, the number of reserved resource blocks (RBs) may correspond to the number of SA symbols used. As another example, the particular Listen-Before-Talk (LBT) sequence used may be selected based on the number of SA symbols used. The disclosure relates in some aspects to reserving resources for multiple HARQ transmissions and communicating an indication of the reserved HARQ resources. As one example, resources for one or more HARQ transmissions may be reserved in advance. In this case, the first HARQ transmission may use an LBT process, while any subsequent HARQ transmissions may be sent immediately in the scheduled subframe(s). As another example, HARQ resources for different HARQ transmissions may be reserved independently (e.g., not reserved in advance). In this case, any subsequent HARQ transmissions may indicate the location of one or more previous HARQ transmissions to facilitate soft combining of the HARQ transmissions at a receiver.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, and so on). In addition, devices may communicate with each other directly via device-to-device (D2D) links 112.

In some scenarios, a D2D link may be a vehicle-to-anything (V2X) link. For example, a first vehicle 114 may communicate via some form (or forms) of V2X communication with a second vehicle 116, a user equipment (UE) 118, a sensor 120, the TRP 106, or some other component (e.g., device) of the wireless communication system 100.

In accordance with the teachings herein, these devices may include functionality to facilitate multiple HARQ transmissions. For example, each of the first vehicle 114, the UE 118, the TRP 106, as well as other components of the wireless communication system 100, may include a module for managing multiple HARQ transmissions 122 for controlling and communicating information relating to the HARQ-related resources used by the devices for communication in the wireless communication system 100 (e.g., via V2X links).

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Example Communication Components

Figure 2:
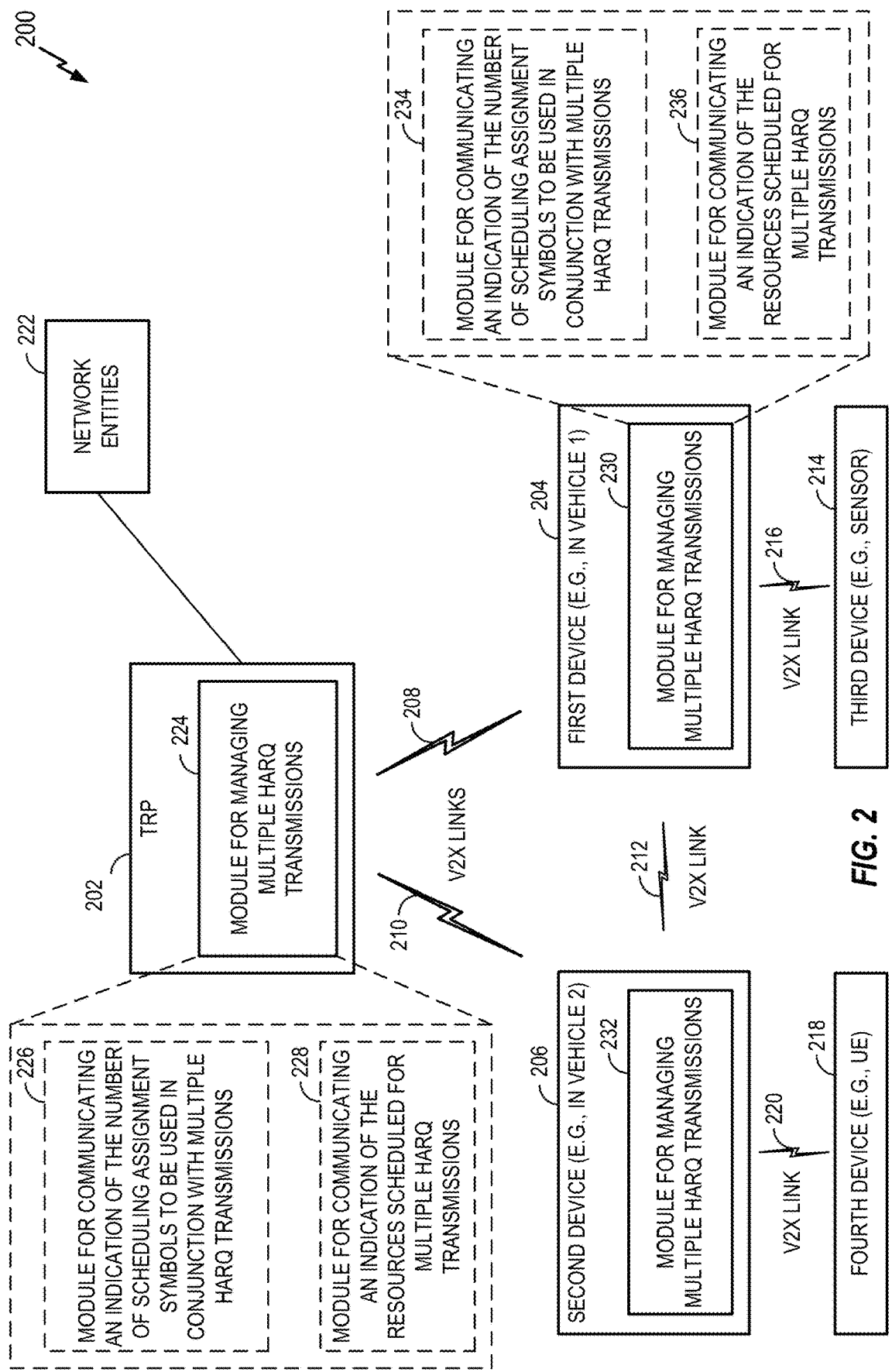
FIG. 2 is a block diagram of another example communication system in which aspects of the disclosure may be used.

FIG. 2 illustrates another example of a wireless communication system 200 where devices communicate via V2X links or other suitable communication links. For example, a transmit receive point (TRP) 202 may communicate with a first device 204 and a second device 206 via a V2X link 208 and a V2X link 210, respectively. In addition, the first device 204 and the second device 206 may communicate via a V2X link 212. The first device 204 and a third device 214 may communicate via a V2X link 216. The second device 206 and a fourth device 218 may communicate via a V2X link 220.

The devices of the wireless communication system 200 may access other communication devices of a wide area network (e.g., via other network entities 222) or access communication devices in other networks (not shown). To reduce the complexity of FIG. 2, only a TRP and four devices are shown. In practice, a wireless communication system may include more of these devices. In some implementations, the TRP 202 may correspond to the TRP 106 of FIG. 1. In addition, the first device 204 and the second device 206 may correspond to the first vehicle 114 and the second vehicle 116 of FIG. 1, respectively.

Communication on the V2X links may use HARQ processes. Accordingly, some of the components of the wireless communication system 200 may include functionality for managing HARQ transmissions. For example, the TRP 202 may include a module for managing multiple HARQ transmissions 224. In some aspects, the module for managing multiple HARQ transmissions 224 may include a module for communicating an indication of the number of scheduling assignment (SA) symbols to be used in conjunction with multiple HARQ transmissions 226. In some aspects, this may involve, on the transmitter side, selecting a communication parameter or function based on the number of SA symbols and/or selecting the number of SA symbols to use based on a communication parameter. In some aspects, this may involve, on the receiver side, determining the number of SA symbols based on received information (e.g., indicative of above communication parameter or function or some other communication parameter or function). As another example, the TRP 202 may include a module for communicating an indication of the resources scheduled for multiple HARQ transmissions 228. In some aspects, this may involve reserving resources for the HARQ transmissions as a group or separately for each HARQ transmission. In some aspects, this may involve communicating an indication of the reserved resources (e.g., as a group or separately).

The first device 204 may include a module for managing multiple HARQ transmissions 230 and the second device 206 may include a module for managing multiple HARQ transmissions 232. Similar to the above, the module for managing multiple HARQ transmissions 230 may include a module for communicating an indication of the number of scheduling assignment (SA) symbols to be used in conjunction with multiple HARQ transmissions 234. In addition, or alternatively, the module for managing multiple HARQ transmissions 230 may include a module for communicating an indication of the resources scheduled for multiple HARQ transmissions 236. The module for managing multiple HARQ transmissions 232 may include similar functionality as the module for managing multiple HARQ transmissions 230. Also, other devices of the wireless communication system 200 (e.g., the third device 216 and the fourth device 218) may include similar functionality (not shown).

Example HARQ Operations

Advances in communication, such as NR, may provide new features to enable higher throughput in V2X communication and other types of communication. For example, improved throughput may be important in certain V2X communication applications such as sensor sharing and autonomous driving.

In NR, the numerology is scalable (e.g., as opposed to LTE where the numerology is fixed). For example, NR supports the use of different lengths of orthogonal frequency division multiplexing (01-DM) symbols. This feature can be used to support a resource contention mechanism such as LBT to provide improved system performance (e.g., by mitigating interference during subframes). Of note, the use of LBT or some similar scheme may be useful in NR in communication scenarios that don't use a central scheduler (e.g., a TRP) to schedule the communication. In such a scenario, communicating devices may schedule their own transmissions (e.g., by exchanging information such as coding rate, reference sequence, HARQ information, and so on).

A communication system may use multiple HARQ transmissions when the packet size for a given transmission is larger than the size of one transmission time interval (TTI) or when higher reliability is desirable (e.g., at the cost of a longer transmission time). The disclosure relates in some aspects to techniques for supporting multiple HARQ transmissions or similar transmissions (e.g., other feedback processes). For purposes of illustration, these techniques will be discussed in the context of HARQ for NR V2X. It should be appreciated, however, that these teachings may be applicable to other types of communication systems and feedback processes.

In NR, a non-centralized access mechanism by a transmitter may involve transmitting an LBT sequence, followed by an SA, followed by data. In some aspects, the LBT sequence indicates that a transmission has started. The LBT sequence may also indicate the RBs that the transmission will use in the current subframe. In some aspects, the SA may carry control information (e.g., coding rate, etc.) that a receiver can use to decode the data. The SA may also indicate the RBs that will be used in subsequent transmissions (e.g., in subsequent subframes).

In NR V2X, the number of information bits in the SA might not be not fixed. For example, the SA size may scale with the packet size and/or the number of HARQ transmissions. As another example, more OFDM symbols can be used to carry the SA information bits to lower the effective coding rate, and subsequently increase the reliability of the SA transmission. To reduce the complexity on the receiver side (e.g., to avoid having to do blind decoding of the SA), it is desirable that the number of SA OFDM symbols is known. The SA and data resources may be reserved through the use a Listen-Before-Talk (LBT) process. Consequently, information about the number of SA symbols being used may be inferred from the LBT process.

Also, since the HARQ transmissions may span several subframes, there is a need for a mechanism to reserve resources for HARQ transmissions on several subframes and to provide details of the reservation to other devices (e.g., other UEs) so that these devices can decode the transmissions. In some implementations, such a mechanism should also be compatible with an LBT-based resource reservation mechanism for single subframe transmissions.

As mentioned above, the number of SA symbols may be inferred from the LBT process. Two examples of how this may be accomplished follow.

In a first example, the number of SA symbols is defined based on the number of reserved resource blocks (RBs). For example, there may be a configurable threshold (e.g., configured by the network) such that the number of SA symbols is N (e.g., 2) if the number of reserved RBs is larger than the threshold. The number of SA symbols is M (e.g., 1) otherwise. This solution is based in some aspects on an observation that the SA size is likely to scale with the packet size. With this option, the SA size may be roughly the same for the same number of reserved RBs, regardless of the number of HARQ transmissions.

The second example involves using a particular LBT sequence (or other suitable sequence) based on the number of SA symbols used. Here, different LBT sequences may be defined in a system to distinguish LBT sequences sent by different devices (e.g., different UEs could randomly select different LBT sequences). A receiver is expected to do a blind detection of received LBT sequences to determine the RB allocations of the SA and the data. Consequently, in accordance with the teachings herein, the receiver could also determine the number of SA symbols used based on the particular LBT sequence that is sent. To this end, the set of all possible LBT sequences may partitioned into, for example, two disjoined sets. In this example, the number of SA symbols to be used is N (e.g., 2) for all sequences in one subset, while the number of SA symbols to be used is M (e.g., 1) for all remaining sequences. A different number of sets of LBT sequences and different quantities of SA symbols could be used in other examples.

Two examples of reserving resources for multiple HARQ transmissions follow.

The first example involves reservation of the HARQ resources for multiple transmissions (e.g., pre-reservation of the subframes and RBs that will be used for some or all of the HARQ transmissions). As one example, resources for all of the HARQ transmissions may be reserved. As another example, resources for the current HARQ transmission and the next HARQ transmission may be reserved. Other combinations could be used in other examples.

Information about the subframes and the RB allocations of the subsequent transmissions may be inferable from the LBT sequence that is used, and the information in the SA regarding any single HARQ transmission. In some aspects, a hopping pattern (e.g., included in the SA) may be used to indicate the resources to be used for different transmissions.

In this first example, the transmitter (e.g., a UE) may perform LBT resource selection for the first HARQ transmission as follows. The LBT process may include selecting one random LBT timer "t" at the beginning of the subframe. The transmitter then waits "t" LBT OFDM symbols before it starts transmitting its LBT sequence. The transmitter remains silent during the "t" LBT OFDM symbols. Consequently, a particular transmitter can detect other transmitters (e.g., UEs) that transmit their LBT sequence before the particular transmitter transmits its LBT sequence (i.e., the other transmitters have chosen a smaller LBT timer than "t"), and thereby avoid the RBs used by those transmitters. The transmitter can then randomly choose a resource among the remaining RBs to transmit its LBT sequence on. The chosen resource for LBT may also be used for SA and data transmission.

For any subsequent HARQ transmissions, the transmitter may select a fixed LBT timer "t"=0, instead of selecting a random "t" timer value. This may ensure that the transmitter always starts transmitting at the beginning of the subframe on the pre-selected resource. All other transmitters that selected an LBT timer larger than 0 will be able to detect the presence of the transmitting transmitter in this subframe. Consequently, these other transmitters can avoid interfering with these HARQ transmissions.

The second example involves independently selecting the resources for different HARQ transmissions. In this case, the RB resource and the transmission subframe is selected independently (e.g., opportunistically) for each HARQ transmission. The SA of each transmission can indicate if HARQ is to be used, and the total number of HARQ transmissions. Also, the SA of a subsequent HARQ transmission may point to one or more previous SA locations and/or data locations to facilitate soft-combining. For example, a second HARQ transmission may include information about the position of (e.g., the subframe and the RBs used by) the first HARQ transmission. As another example, a third HARQ transmission may include information about the position of the first and second HARQ transmissions. As yet another example, a third HARQ transmission may include information about the position of the second HARQ transmission while the second HARQ transmission may include information about the position of the first HARQ transmission. Other combinations may be used in other examples.

These and other aspects of the above example for supporting multiple HARQ transmission will now be described with reference to FIGS. 3-6.

First Example SA Symbol Indication Process

Figure 3:
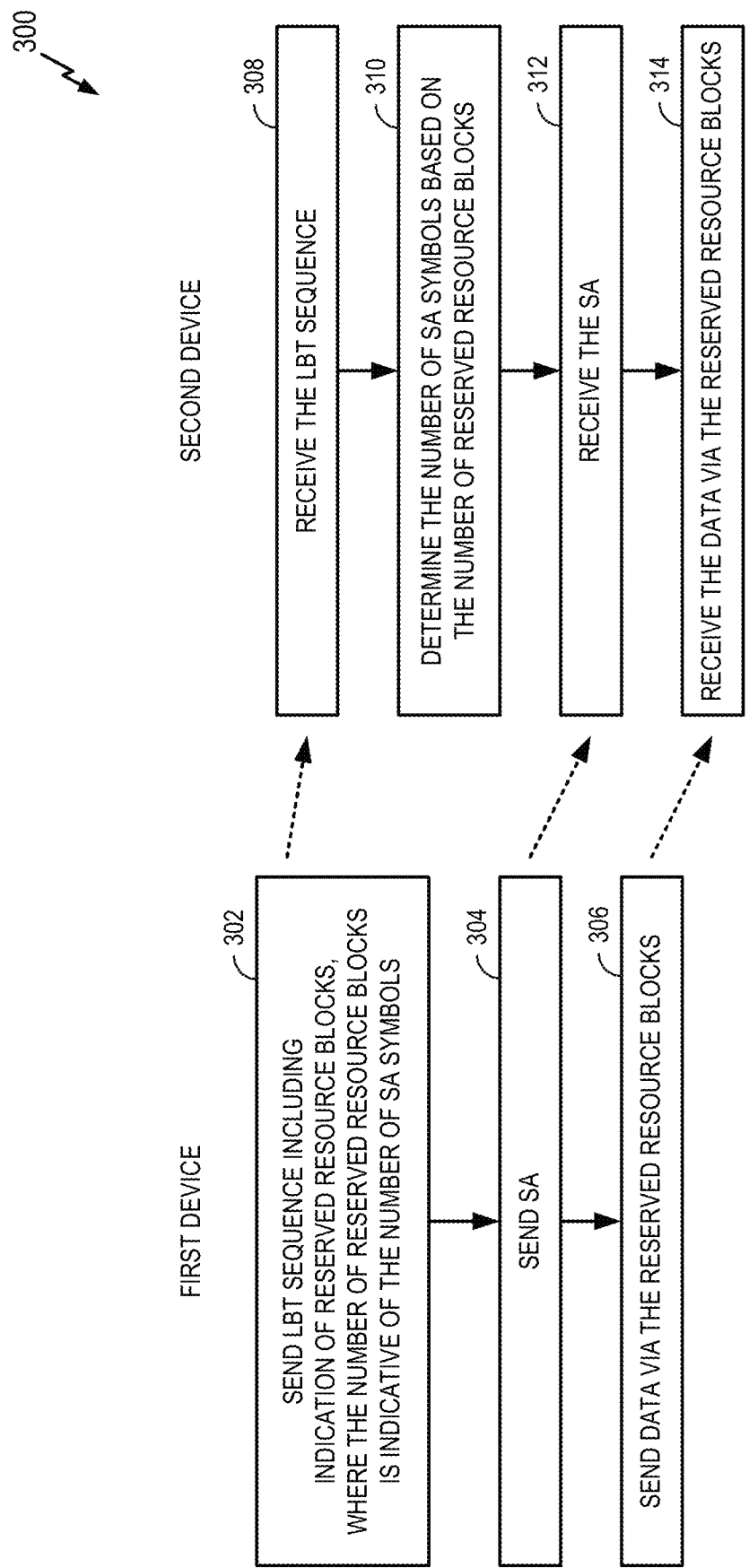
FIG. 3 is a diagram of an example process for communicating how many scheduling assignment (SA) symbols will be used in accordance with some aspects of the disclosure, where the communicating is based at least in part on a quantity of resource blocks.

FIG. 3 illustrates an example of communicating the number of SA symbols based on the number of reserved RBs (e.g., the first example for determining the number of SA symbols described above). It should be appreciated that information other than RBs could be used to indicate the number of SA symbols in other examples. In addition, an SA may be quantized in other ways (e.g., other than symbols) and that the quantity of these quantized elements could be associated with a number of RBs or other information to convey the number of such elements being used.

At block 302, a first device (e.g., a device capable of V2X communication) sends an LBT sequence. The LBT sequence includes an indication of the RBs reserved for the current transmission. In this case, the number of reserved RBs is indicative of the number of SA symbols used. For example, two SA symbols may be used if the number of RBs is greater than a threshold, and one SA symbol may be used otherwise.

At block 304, the first device sends an SA (or some other suitable element including control information).

At block 306, the first device sends data via the reserved resource blocks.

At block 308, a second device (e.g., a device capable of V2X communication) receives the LBT sequence sent by the first device at block 302.

At block 310, the second device determines the number of SA symbols being used based on the number of reserved RBs indicated by the LBT sequence.

At block 312, the second device receives the SA sent by the first device at block 304. Here, the second device uses the number of SA symbols determined at block 310 to decode the correct number of SA symbols.

At block 314, the second device receives the data the first device sent via the reserved RBs at block 306. In some aspects, the second device may use control information (e.g., coding rate, etc.) included in the SA to decode the data.

Second Example SA Symbol Indication Process

Figure 4:
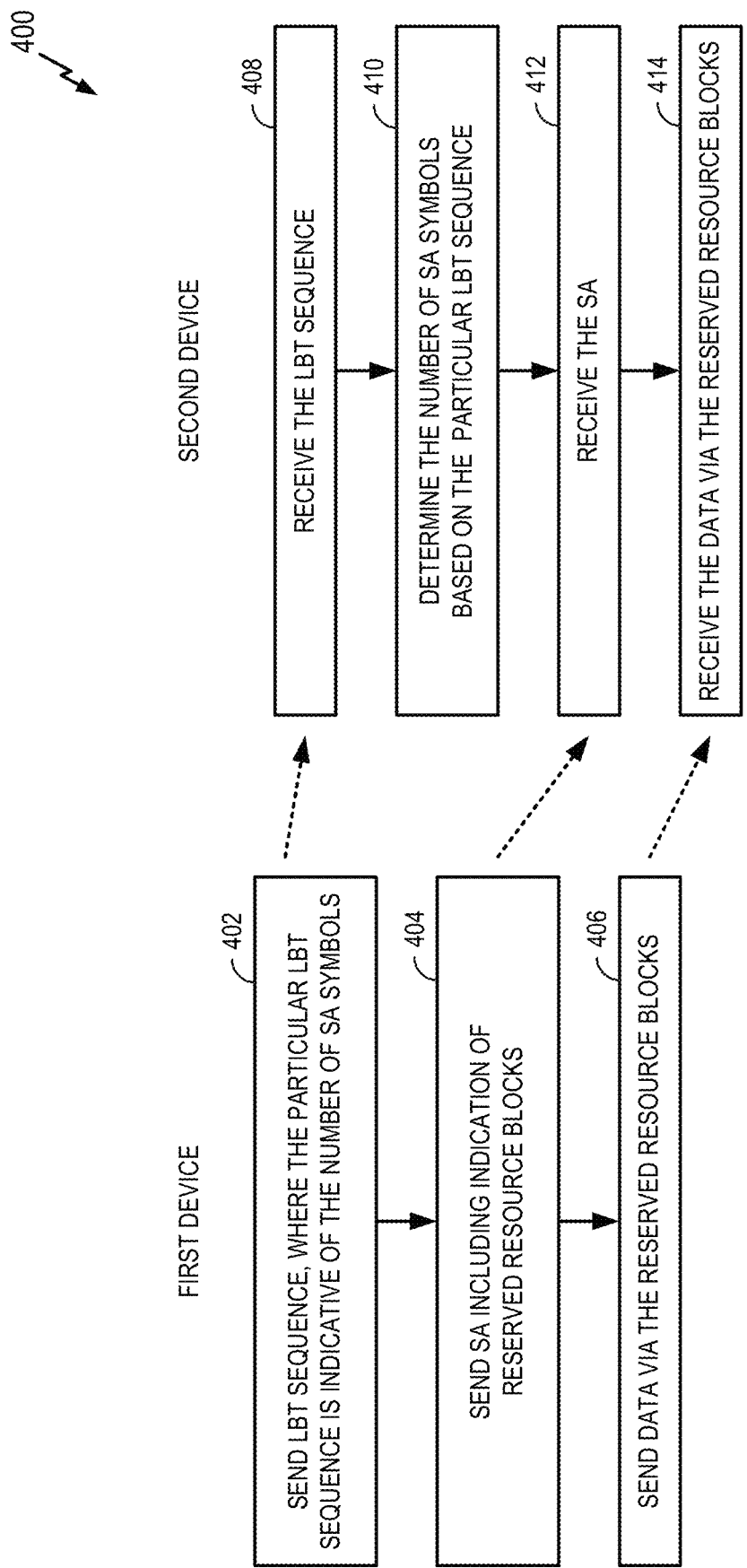
FIG. 4 is a diagram of an example process for communicating how many SA symbols will be used in accordance with some aspects of the disclosure, where the communicating is based at least in part on a resource contention sequence.

FIG. 4 illustrates an example of communicating the number of SA symbols based on the particular LBT sequence being used (e.g., the second example for determining the number of SA symbols described above). It should be appreciated that resource contention schemes other than LBT could be used in other examples.

At block 402, a first device (e.g., a device capable of V2X communication) sends an LBT sequence. In this case, the particular LBT sequence used is indicative of the number of SA symbols that will be used. For example, if the first device is using one SA symbol, the first device may select the LBT sequence from a first set of LBT sequences. Conversely, if the first device is using two SA symbols, the first device may select the LBT sequence from a second set of LBT sequences.

At block 404, the first device sends an SA. The SA includes an indication of the resource blocks reserve for the current transmission.

At block 406, the first device sends data via the reserved resource blocks.

At block 408, a second device (e.g., a device capable of V2X communication) receives the LBT sequence sent by the first device at block 402.

At block 410, the second device determines the number of SA symbols being used based on the particular received LBT sequence.

At block 412, the second device receives the SA sent by the first device at block 404.

At block 414, the second device receives the data the first device sent via the reserved RBs at block 406.

First Example HARQ Resource Process

Figure 5:
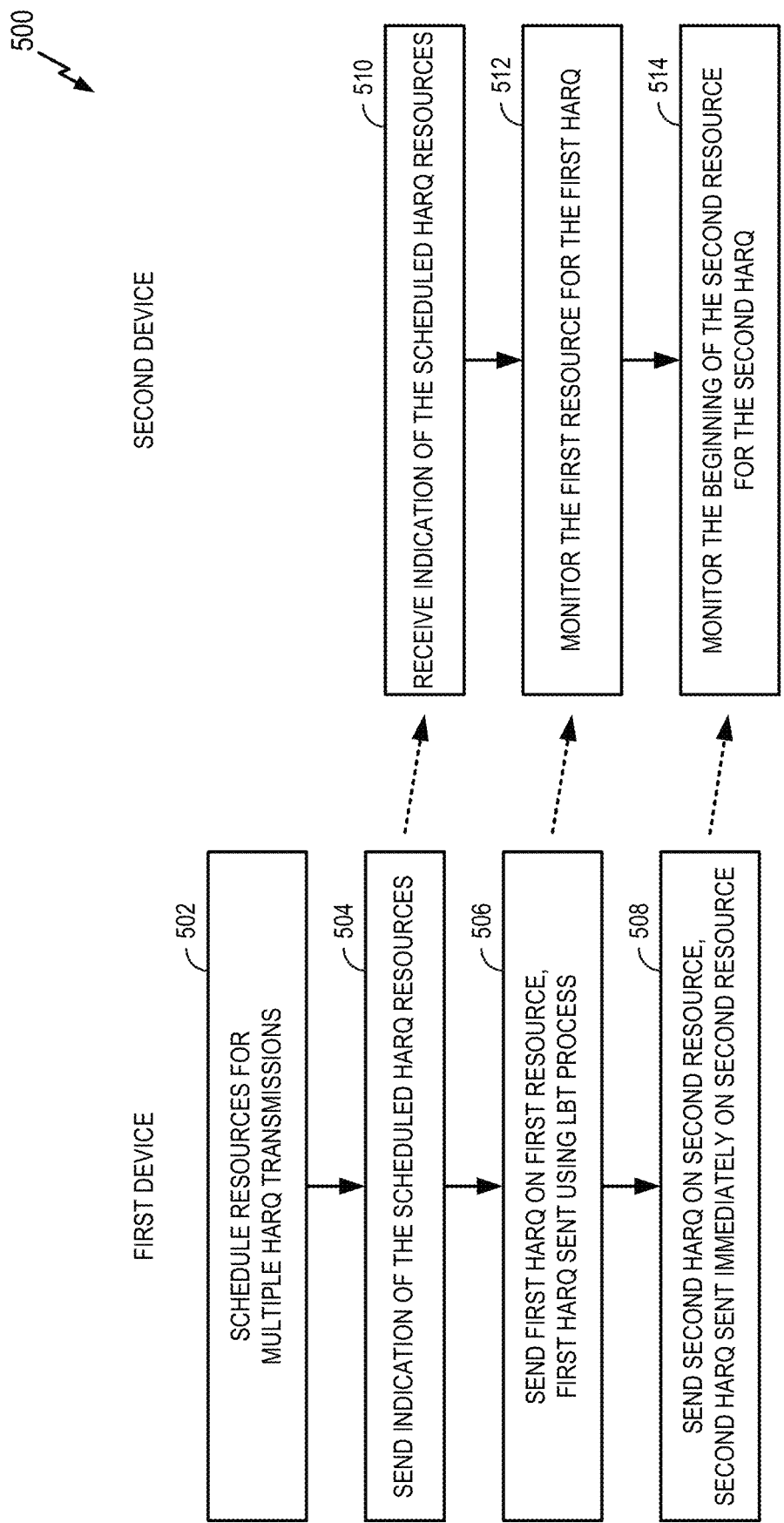
FIG. 5 is a diagram of an example process for pre-reservation of multiple HARQ resources and communicating HARQ information in accordance with some aspects of the disclosure.

FIG. 5 illustrates an example of collectively reserving resources for all HARQ transmissions (e.g., the first example for reserving HARQ resources described above). It should be appreciated that other types of feedback processes (e.g., other than HARQ) could be used in other examples. It should also be appreciated that various types of resources could be reserved for a HARQ process or other feedback process.

To reduce the complexity of FIG. 5, only two HARQ processes are shown. A different number of HARQ processes could be used in other examples. In addition, some operations associated with the HARQ processes are not shown in FIG. 5 to further reduce the complexity of the figure.

At block 502, a first device (e.g., a device capable of V2X communication) schedules resources for multiple HARQ transmissions. Thus, in this case, the first device schedules (e.g., pre-schedules) all of the resources for all of the HARQ transmissions before invoking any of the HARQ transmissions.

At block 504, the first device sends an indication of the scheduled HARQ resources.

At block 506, the first device sends a first HARQ on a first resource of the scheduled resources. In addition, the first device sends the first HARQ using an LBT process (or some other suitable resource contention process).

At block 508, the first device sends a second HARQ on a second resource of the scheduled resources. In this case, the first device sends the second HARQ immediately on (e.g., at the beginning of) the second resource. For example, as discussed above, the first device may use a timer "t"=0 for the second HARQ and any subsequent HARQs for this transmission.

At block 510, a second device (e.g., a device capable of V2X communication) receives the indication of the scheduled HARQ resources sent by the first device at block 502.

At block 512, the second device monitors the first resource of the scheduled HARQ resources (i.e., as indicated by the indication received at block 510) for the first HARQ sent by the first device at block 506. Since the first device used an LBT process (or some other suitable process) to send the first HARQ, the second device may need to monitor and decode all of the information received on the first resource to recover the first HARQ.

At block 514, the second device monitors the second resource of the scheduled HARQ resources (i.e., as indicated by the indication received at block 510) for the second HARQ sent by the first device at block 508. In this case, since the second device may be informed that the first device sent the second HARQ via the second resource, the second device may simply monitor and decode the information received via the second resource to recover the second HARQ without having to do blind detection of every LBT sequence in that resource. Alternatively, the second device may monitor and decode all of the information received on the second resource to recover the second HARQ.

Second Example HARQ Resource Process

Figure 6:
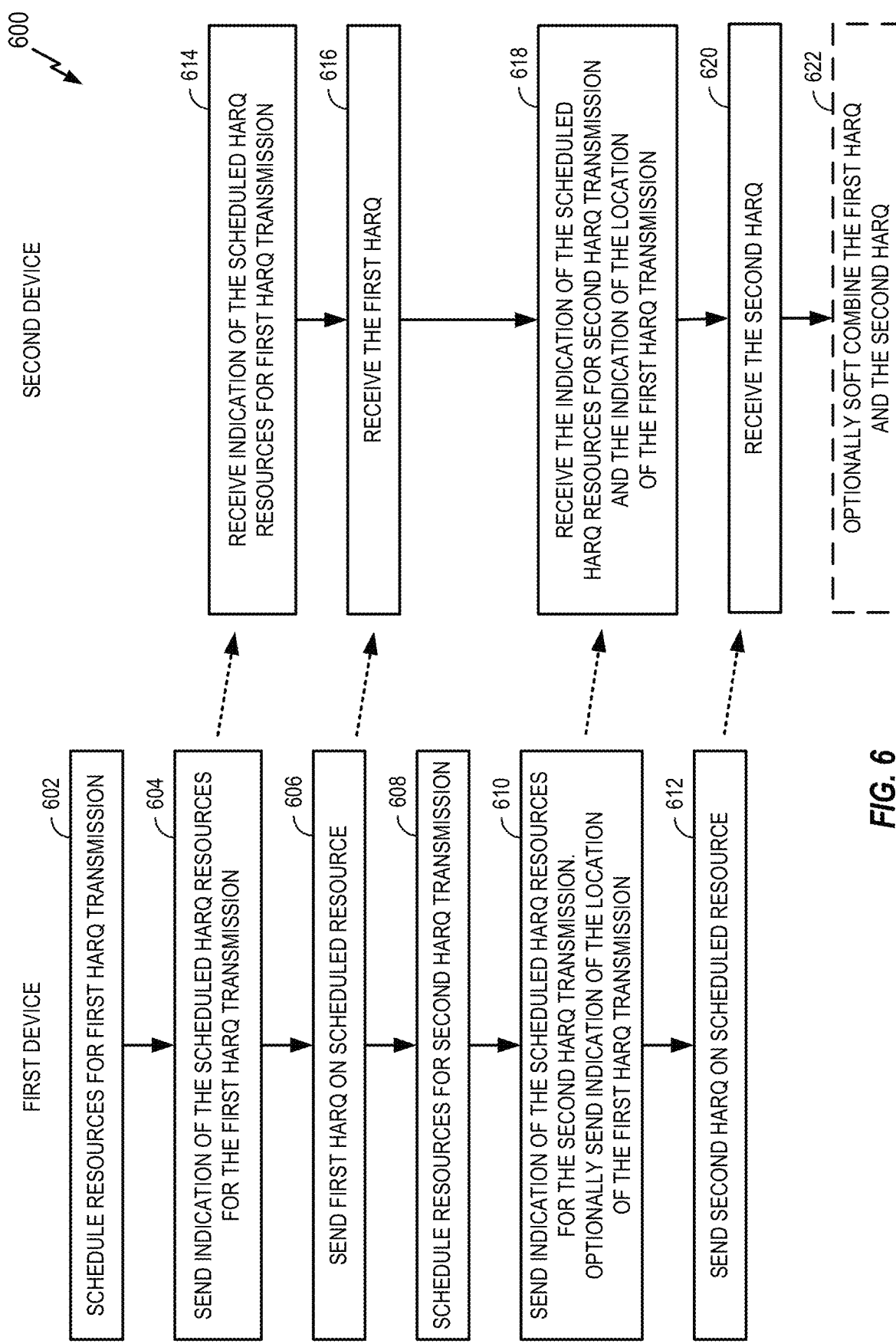
FIG. 6 is a diagram of an example process for independently scheduling HARQ resources and communicating HARQ information in accordance with some aspects of the disclosure.

FIG. 6 illustrates an example of separately reserving resources for different HARQ transmissions (e.g., the second example for reserving HARQ resources described above). It should be appreciated that other types of feedback processes (e.g., other than HARQ) could be used in other examples. It should also be appreciated that various types of resources could be reserved for a HARQ process or other feedback process.

To reduce the complexity of FIG. 6, only two HARQ processes are shown. A different number of HARQ processes could be used in other examples. In addition, some operations associated with the HARQ processes are not shown in FIG. 6 to further reduce the complexity of the figure.

At block 602, a first device (e.g., a device capable of V2X communication) schedules resources for a first HARQ transmission. Thus, in this case, the first device does not initially schedule (e.g., pre-schedule) all of the resources for all of the HARQ transmissions.

At block 604, the first device sends an indication of the scheduled HARQ resources for the first HARQ transmission.

At block 606, the first device sends a first HARQ on the resource scheduled for the first HARQ.

At block 608, the first device schedules resources for a second HARQ transmission.

At block 610, the first device sends an indication of the scheduled HARQ resources for the second HARQ transmission. In addition, the first device may send an indication of the location of the first HARQ transmission (e.g., to enable soft combining of the first and second HARQs).

At block 612, the first device sends a second HARQ on the resource scheduled for the second HARQ.

At block 614, a second device (e.g., a device capable of V2X communication) receives the indication of the scheduled resources for the first HARQ sent by the first device at block 604.

At block 616, the second device receives the first HARQ sent by the first device at block 606.

At block 618, the second device receives the indication of the scheduled resources for the second HARQ sent by the first device at block 610. In addition, the second device may optionally receive the indication of the location of the first HARQ transmission sent by the first device at block 610.

At block 620, the second device receives the second HARQ sent by the first device at block 612.

At optional block 622, the second device may soft combine the information received for the first HARQ and the second HARQ to recover data sent by the first device.

First Example Apparatus

Figure 7:
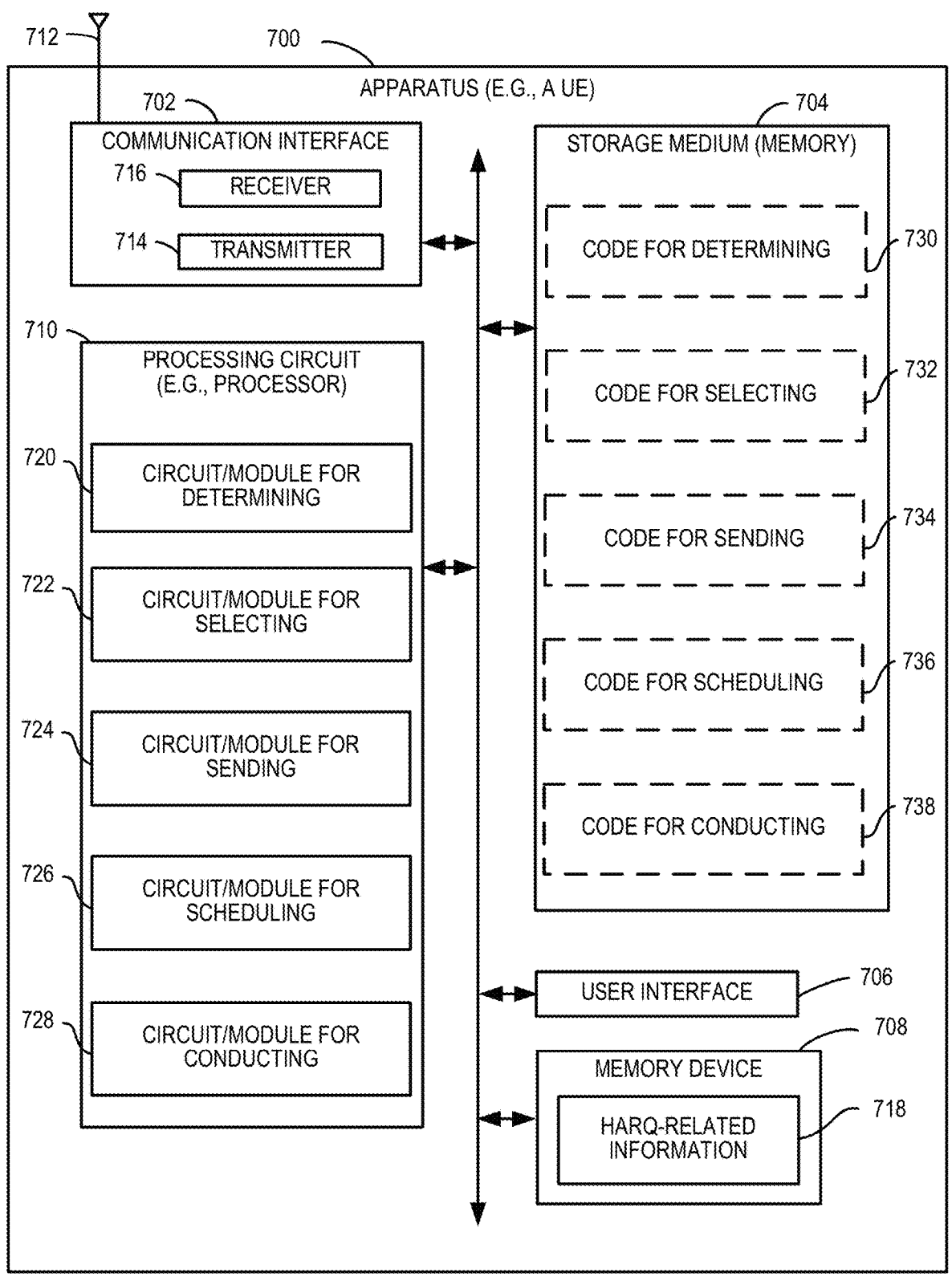
FIG. 7 is a block diagram illustrating an example hardware implementation for an apparatus (e.g., an electronic device) that can support communication in accordance with some aspects of the disclosure.

FIG. 7 illustrates a block diagram of an example hardware implementation of an apparatus 700 configured to communicate (e.g., send HARQ transmissions) according to one or more aspects of the disclosure. The apparatus 700 could embody or be implemented within a UE, a transmit receive point (TRP), an access point, or some other type of device that supports communication as taught herein. In various implementations, the apparatus 700 could embody or be implemented within an access terminal, a base station, or some other type of device. In various implementations, the apparatus 700 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 700 includes a communication interface 702 (e.g., at least one transceiver), a storage medium 704, a user interface 706, a memory device 708, and a processing circuit 710 (e.g., at least one processor). These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, the user interface 706, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the apparatus 700. For example, the communication interface 702 may include circuitry and/or programming adapted to facilitate the communication of information bi-directionally with respect to one or more communication devices in a network. Thus, in some implementations, the communication interface 702 may be coupled to one or more antennas 712 for wireless communication within a wireless communication system. In some implementations, the communication interface 702 may be configured for wire-based communication. For example, the communication interface 702 could be a bus interface, a send/receive interface, or some other type of signal interface including drivers, buffers, or other circuitry for outputting and/or obtaining signals (e.g., outputting signal from and/or receiving signals into an integrated circuit). The communication interface 702 can be configured with one or more standalone receivers and/or transmitters, as well as one or more transceivers. In the illustrated example, the communication interface 702 includes a transmitter 714 and a receiver 716.

The memory device 708 may represent one or more memory devices. As indicated, the memory device 708 may maintain HARQ-related information 718 along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols. In some aspects, the storage medium 704 may include a non-transitory computer-readable medium storing computer-executable code, including code to perform the functionality described herein.

The processing circuit 710 is generally adapted for processing, including the execution of such programming stored on the storage medium 704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. For example, the processing circuit 710 may be configured to perform any of the steps, functions, and/or processes described with respect to FIGS. 1-6 and 8-11. As used herein, the term "adapted" in relation to the processing circuit 710 may refer to the processing circuit 710 being one or more of configured, used, implemented, and/or programmed to perform a particular process, function, operation and/or routine according to various features described herein.

The processing circuit 710 may be a specialized processor, such as an application specific integrated circuit (ASIC) that serves as a means for (e.g., structure for) carrying out any one of the operations described in conjunction with FIGS. 1-6 and 8-11. The processing circuit 710 may serve as one example of a means for transmitting and/or a means for receiving. In various implementations, the processing circuit 710 may provide and/or incorporate, at least in part, the functionality described above for the first device 204 (e.g., the module for managing multiple HARQ transmissions 230) of FIG. 2.

According to at least one example of the apparatus 700, the processing circuit 710 may include one or more of a circuit/module for determining 720, a circuit/module for selecting 722, a circuit/module for sending 724, a circuit/module for scheduling 726, or a circuit/module for conducting 728. In various implementations, the circuit/module for determining 720, the circuit/module for selecting 722, the circuit/module for sending 724, the circuit/module for scheduling 726, or the circuit/module for conducting 728 may provide and/or incorporate, at least in part, the functionality described above for the first device 204 (e.g., the module for managing multiple HARQ transmissions 230) of FIG. 2.

As mentioned above, programming stored by the storage medium 704, when executed by the processing circuit 710, causes the processing circuit 710 to perform one or more of the various functions and/or process operations described herein. For example, the programming may cause the processing circuit 710 to perform the various functions, steps, and/or processes described herein with respect to FIGS. 1-6 and 8-11 in various implementations. As shown in FIG. 7, the storage medium 704 may include one or more of code for determining 730, code for selecting 732, code for sending 734, code for scheduling 736, or code for conducting 738. In various implementations, the code for determining 730, the code for selecting 732, the code for sending 734, the code for scheduling 736, or the code for conducting 738 may be executed or otherwise used to provide the functionality described herein for the circuit/module for determining 720, the circuit/module for selecting 722, the circuit/module for sending 724, the circuit/module for scheduling 726, or the circuit/module for conducting 728.

The circuit/module for determining 720 may include circuitry and/or programming (e.g., code for determining 730 stored on the storage medium 704) adapted to perform several functions relating to, for example, determining information. In some aspects, the circuit/module for determining 720 (e.g., a means for determining) may correspond to, for example, a processing circuit.

Initially, the circuit/module for determining 720 may obtain information upon which the determination is to be based. For example, the circuit/module for determining 720 may obtain information (e.g., from the memory device 708, or some other component of the apparatus 700) regarding resource blocks and/or control information elements to be used for an error correction operation. The circuit/module for determining 720 may then make the determination based on the obtained information (e.g., as discussed herein in conjunction with FIGS. 1-6). The circuit/module for determining 720 may then output an indication of the determination (e.g., to the circuit/module for selecting 722, the circuit/module for sending 724, the memory device 708, or some other component of the apparatus 700).

The circuit/module for selecting 722 may include circuitry and/or programming (e.g., code for selecting 732 stored on the storage medium 704) adapted to perform several functions relating to, for example, making a selection. In some aspects, the circuit/module for selecting 722 (e.g., a means for selecting) may correspond to, for example, a processing circuit.

The circuit/module for selecting 722 may make a selection based on one or more inputs. For example, the circuit/module for selecting 722 may select a quantity of control information elements to be used for an error correction operation based on a determined quantity of resource blocks. As another example, the circuit/module for selecting 722 may select a resource contention sequence to use for an error correction operation based on a determined quantity of control information elements. Thus, the circuit/module for selecting 736 may initially obtain input information (e.g., from the circuit/module for determining 728, the memory device 708, or some other component of the apparatus 700). The circuit/module for circuit/module for selecting 736 can thus make the selection based on the appropriate input (e.g., as discussed herein in conjunction with FIGS. 1-6). The circuit/module for selecting 736 may then output an indication of the selection (e.g., to the communication interface 702, the memory device 708, or some other component of the apparatus 700).

The circuit/module for sending 724 may include circuitry and/or programming (e.g., code for sending 734 stored on the storage medium 704) adapted to perform several functions relating to, for example, sending (e.g., transmitting) information. In some implementations, the circuit/module for sending 724 may obtain information (e.g., from the memory device 708, the circuit/module for determining 720, the circuit/module for selecting 722, or some other component of the apparatus 700) and process the information (e.g., encode the information for transmission). For example, the circuit/module for sending 724 may obtain information to be transmitted including: information indicative of a determined quantity of resource block; control information elements; a resource contention sequence; SA symbols, or data. In some scenarios, the circuit/module for sending 724 sends the information to another component (e.g., the transmitter 714, the communication interface 702, or some other component) that will transmit the information to another device. In some scenarios (e.g., if the circuit/module for sending 724 includes a transmitter), the circuit/module for sending 724 transmits the information directly to another device (e.g., the ultimate destination) via radio frequency signaling or some other type of signaling suitable for the applicable communication medium.

The circuit/module for sending 724 (e.g., a means for sending) may take various forms. In some aspects, the circuit/module for sending 724 may correspond to, for example, an interface (e.g., a bus interface, a send/receive interface, or some other type of signal interface), a communication device, a transceiver, a transmitter, or some other similar component as discussed herein. In some implementations, the communication interface 702 includes the circuit/module for sending 724 and/or the code for sending 734. In some implementations, the circuit/module for sending 724 and/or the code for sending 734 is configured to control the communication interface 702 (e.g., a transceiver or a transmitter) to send information.

The circuit/module for scheduling 726 may include circuitry and/or programming (e.g., code for scheduling 736 stored on the storage medium 704) adapted to perform several functions relating to, for example, scheduling at least one resource for at least one error correction operation (e.g., a HARQ operation). In some aspects, the circuit/module for scheduling 726 (e.g., a means for scheduling) may correspond to, for example, a processing circuit.

In some aspects, the circuit/module for scheduling 726 may perform the scheduling based on at least one criterion. For example, the circuit/module for scheduling 726 may schedule resources for HARQ operations jointly or independently.

In some aspects, the circuit/module for scheduling 726 may perform one or more of the scheduling operations described herein (e.g., in conjunction with FIGS. 1-6) to schedule error correction operations. The circuit/module for scheduling 726 may then output an indication of the schedule (e.g., to the circuit/module for conducting 728, the communication interface 702, the memory device 708, or some other component).

The circuit/module for conducting 728 may include circuitry and/or programming (e.g., code for conducting 738 stored on the storage medium 704) adapted to perform several functions relating to, for example, conducting at least one error correction operation (e.g., at least one HARQ operation). In some aspects, the circuit/module for conducting 728 (e.g., a means for conducting) may correspond to, for example, a processing circuit.

In some aspects, the circuit/module for conducting 728 may perform the operations based on at least one criterion. For example, the circuit/module for conducting 728 may conduct certain operations on certain resources. In some aspects, the circuit/module for conducting 728 may perform one or more of the error correction operations described herein (e.g., in conjunction with FIGS. 1-6). The circuit/module for conducting 728 may thus send and receive information to perform the error correction operation(s) (e.g., using the communication interface 702, the memory device 708, or some other component).

First Example Process

Figure 8:
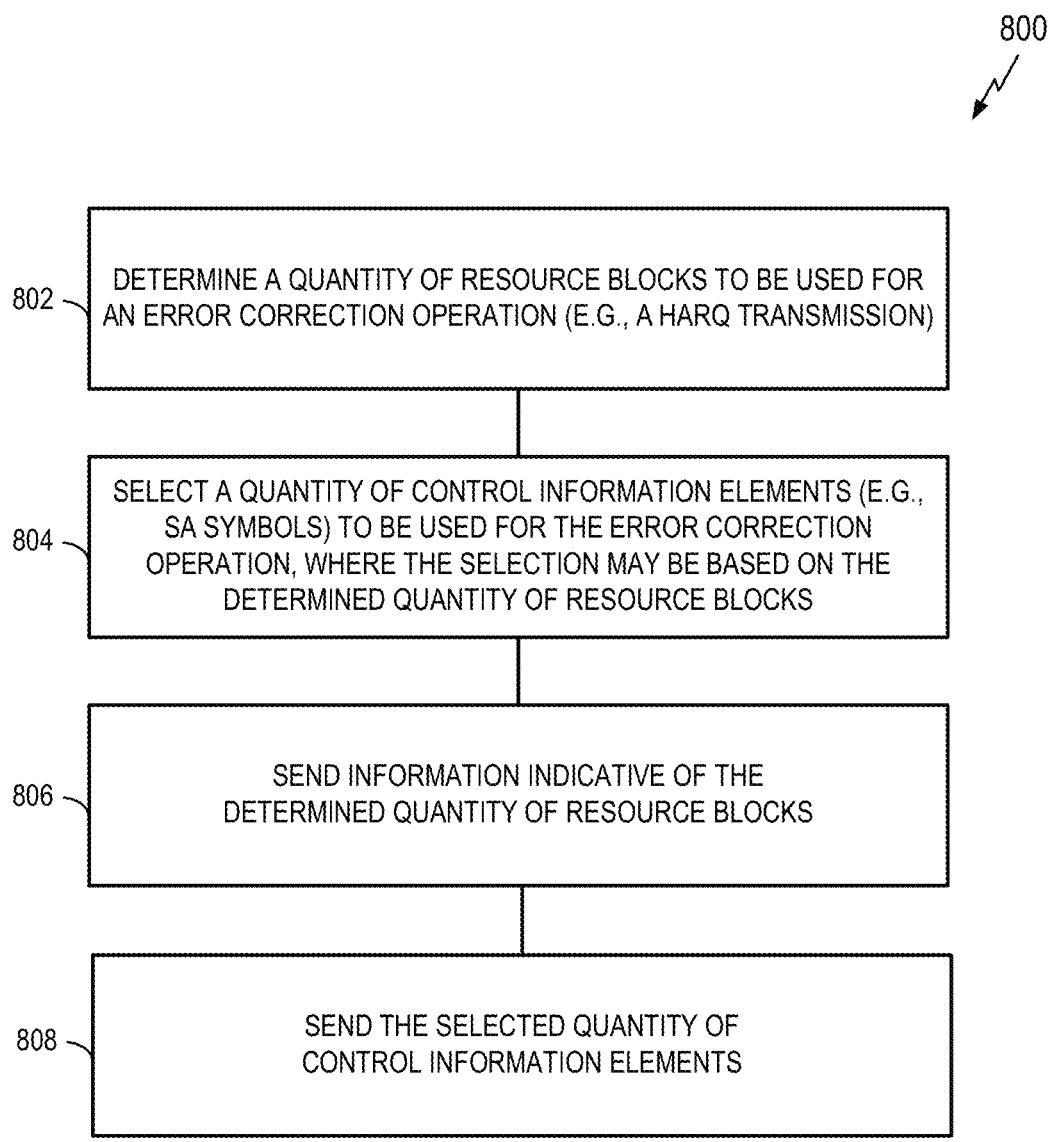
FIG. 8 is a flowchart illustrating an example of a send-side process for communicating how many SA symbols will be used in accordance with some aspects of the disclosure, where the communicating is based at least in part on a quantity of resource blocks.

FIG. 8 illustrates a process 800 for communication in accordance with some aspects of the disclosure. The process 800 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 800 may be implemented by any suitable apparatus capable of supporting communication-related operations (e.g., V2X operations).

At block 802, an apparatus (e.g., a UE) determines a quantity of resource blocks to be used for an error correction operation. In some aspects, the error correction operation may include (e.g., may be) a hybrid automatic repeat request (HARQ) transmission. In some aspects, the error correction operation may include sending data via a portion of the determined quantity of resource blocks.

At block 804, the apparatus selects a quantity of control information elements to be used for the error correction operation. In some aspects, the selection may be based on the determined quantity of resource blocks. In some aspects, the selected quantity of control information elements include (e.g., may be) a quantity of scheduling assignment (SA) symbols. In some aspects, each control information element may include information for decoding data sent during the error correction operation.

In some aspects, the selection of the quantity of control information elements may include: comparing the determined quantity of resource blocks to a threshold; and identifying the quantity of control information elements to be used based on the comparison. In some aspects, the identification of the quantity of control information elements may include: electing to use a first quantity of the control information elements if the determined quantity of resource blocks exceeds the threshold; or electing to use a second quantity of the control information elements if the determined quantity of resource blocks does not exceed the threshold, wherein the second quantity may be less than the first quantity.

At block 806, the apparatus sends information indicative of the quantity of resource blocks. In some aspects, the information indicative of the determined quantity of resource blocks may be sent via a Listen-Before-Talk (LBT) sequence. For example, the apparatus may send an LBT sequence that indicates the RBs to be used to send an SA and data.

At block 808, the apparatus sends the selected quantity of control information elements. For example, the apparatus may send the SA via the determined quantity of symbols (e.g., via one or two symbols).

In some aspects, a process in accordance with the teachings herein may include any combination of the above operations and/or features.

Second Example Process

Figure 9:
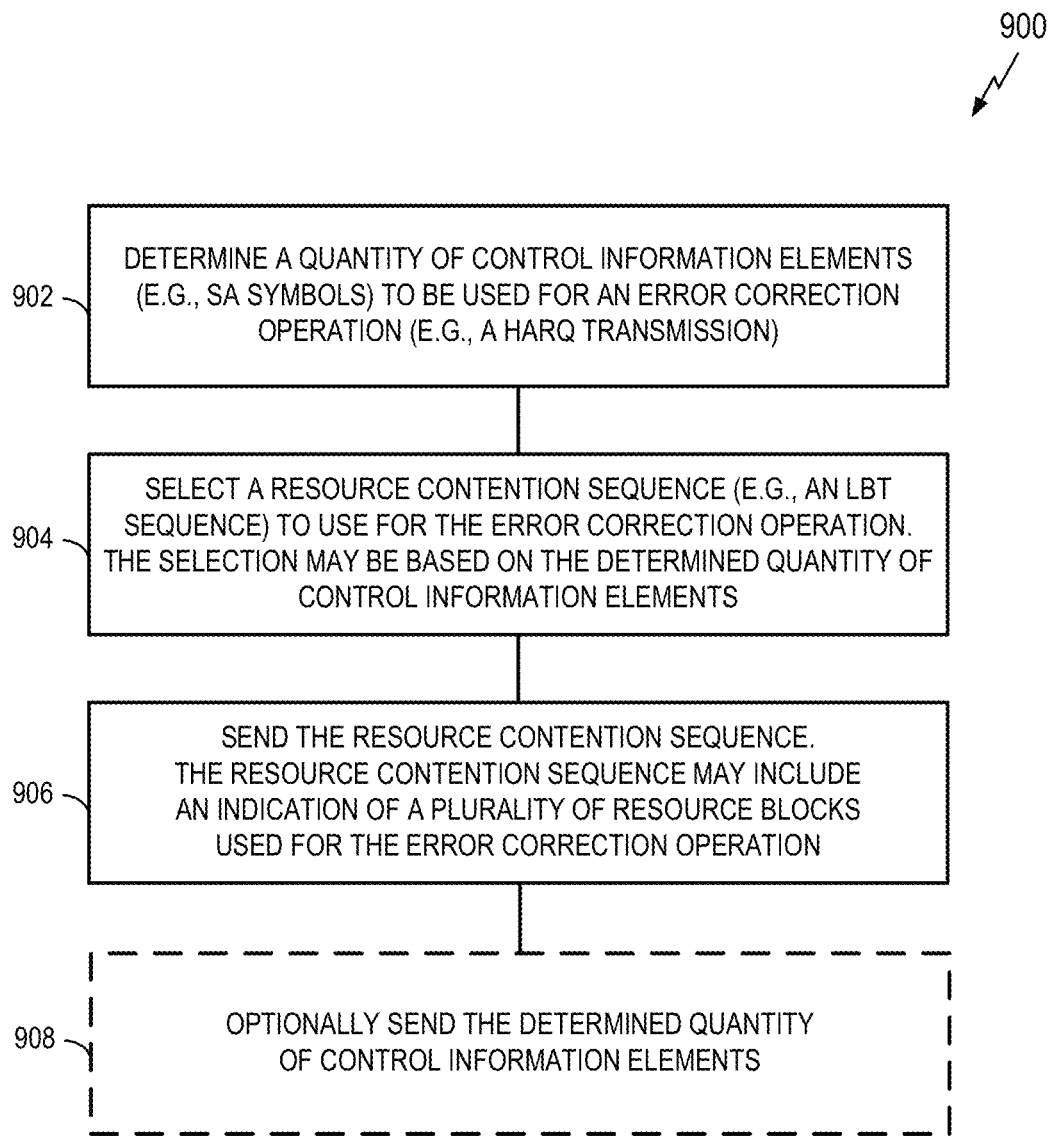
FIG. 9 is a flowchart illustrating an example of a send-side process for communicating how many SA symbols will be used in accordance with some aspects of the disclosure, where the communicating is based at least in part on a resource contention sequence.

FIG. 9 illustrates a process 900 for communication in accordance with some aspects of the disclosure. The process 900 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 900 may be implemented by any suitable apparatus capable of supporting communication-related operations (e.g., V2X operations).

At block 902, an apparatus (e.g., a UE) determines a quantity of control information elements to be used for an error correction operation. In some aspects, the determined quantity of control information elements may include (e.g., may be) a quantity of scheduling assignment (SA) symbols. In some aspects, the error correction operation may include (e.g., may be) a hybrid automatic repeat request (HARQ) transmission. In some aspects, each control information element may include information for decoding data sent during the error correction operation.

At block 904, the apparatus selects a resource contention sequence to use for the error correction operation. In some aspects, the selection may be based on the determined quantity of control information elements. In some aspects, the selected resource contention sequence may include (e.g., may be) a Listen-Before-Talk (LBT) sequence.

In some aspects, the selection of the resource contention sequence may include: comparing the determined quantity of control information elements to a threshold; and identifying the resource contention sequence to be used based on the comparison. In some aspects, the identification of the resource contention sequence may include: electing to use a resource contention sequence from a first set of resource contention sequences if the determined quantity of control information elements exceeds the threshold; or electing to use a resource contention sequence from a second set of resource contention sequences if the determined quantity of control information elements does not exceed the threshold.

At block 906, the apparatus sends the resource contention sequence, wherein the resource contention sequence comprises an indication of a plurality of resource blocks used for the error correction operation.

At optional block 908, the apparatus may send the determined quantity of control information elements (e.g., send the determined quantity of SA symbols after sending the resource contention sequence). For example, the apparatus may send the SA via the determined quantity of symbols (e.g., via one or two symbols).

In some aspects, the error correction operation may include sending data via a portion of the resource blocks after sending the selected resource contention sequence.

In some aspects, a process in accordance with the teachings herein may include any combination of the above operations and/or features.

Third Example Process

Figure 10:
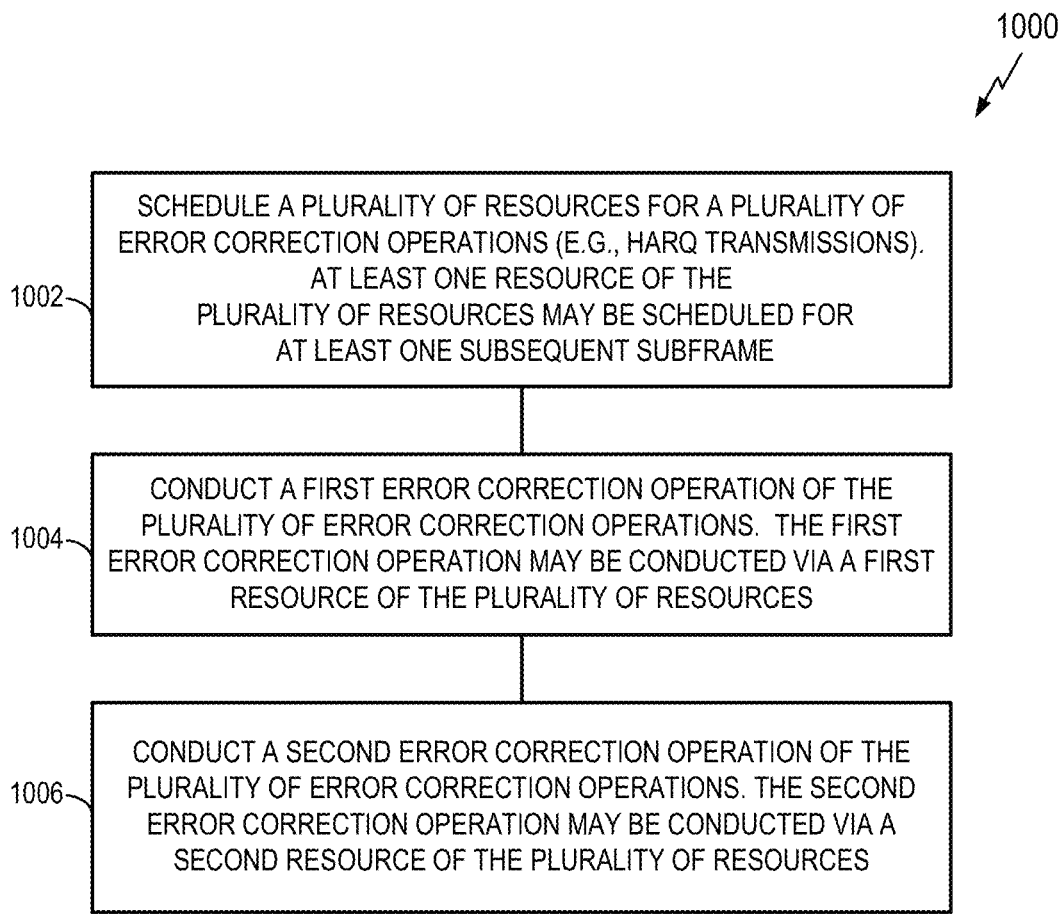
FIG. 10 is a flowchart illustrating an example of a process for pre-reservation of multiple HARQ resources and sending HARQ information in accordance with some aspects of the disclosure.

FIG. 10 illustrates a process 1000 for communication in accordance with some aspects of the disclosure. The process 1000 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 1000 may be implemented by any suitable apparatus capable of supporting communication-related operations (e.g., V2X operations).

At block 1002, an apparatus (e.g., a UE) schedules a plurality of resources for a plurality of error correction operations. In some aspects, at least one resource of the plurality of resources may be scheduled for at least one subsequent subframe. In some aspects, the error correction operations may include (e.g., may be) hybrid automatic repeat request (HARQ) transmissions.

At block 1004, the apparatus conducts a first error correction operation of the plurality of error correction operations. In some aspects, the first error correction operation may be conducted via a first resource of the plurality of resources. In some aspects, the first error correction operation may include sending a Listen-Before-Talk (LBT) sequence.

In some aspects, the first error correction operation may include sending a resource contention sequence including at least one indication of at least one other resource of the plurality of resources scheduled for a current subframe. In some aspects, the resource contention sequence may include (e.g., may be) a Listen-Before-Talk (LBT) sequence.

In some aspects, the first error correction operation may include sending at least one control information element that includes at least one indication of the at least one resource scheduled for the at least one subsequent subframe. In some aspects, the at least one control information element may include (e.g., may be) at least one scheduling assignment (SA) symbol. In some aspects, each SA symbol may include information for decoding data sent via the error correction operations.

At block 1006, the apparatus conducts a second error correction operation of the plurality of error correction operations, wherein the second error correction operation is conducted via a second resource of the plurality of resources. In some aspects, the second error correction operation may include sending information at a beginning of a scheduled subframe.

In some aspects, the second error correction operation may include sending at least one control information element comprising at least one indication of the at least one resource scheduled for the at least one subsequent subframe. In some aspects, the at least one control information element may include (e.g., may be) at least one scheduling assignment (SA) symbol.

In some aspects, a process in accordance with the teachings herein may include any combination of the above operations and/or features.

Fourth Example Process

Figure 11:
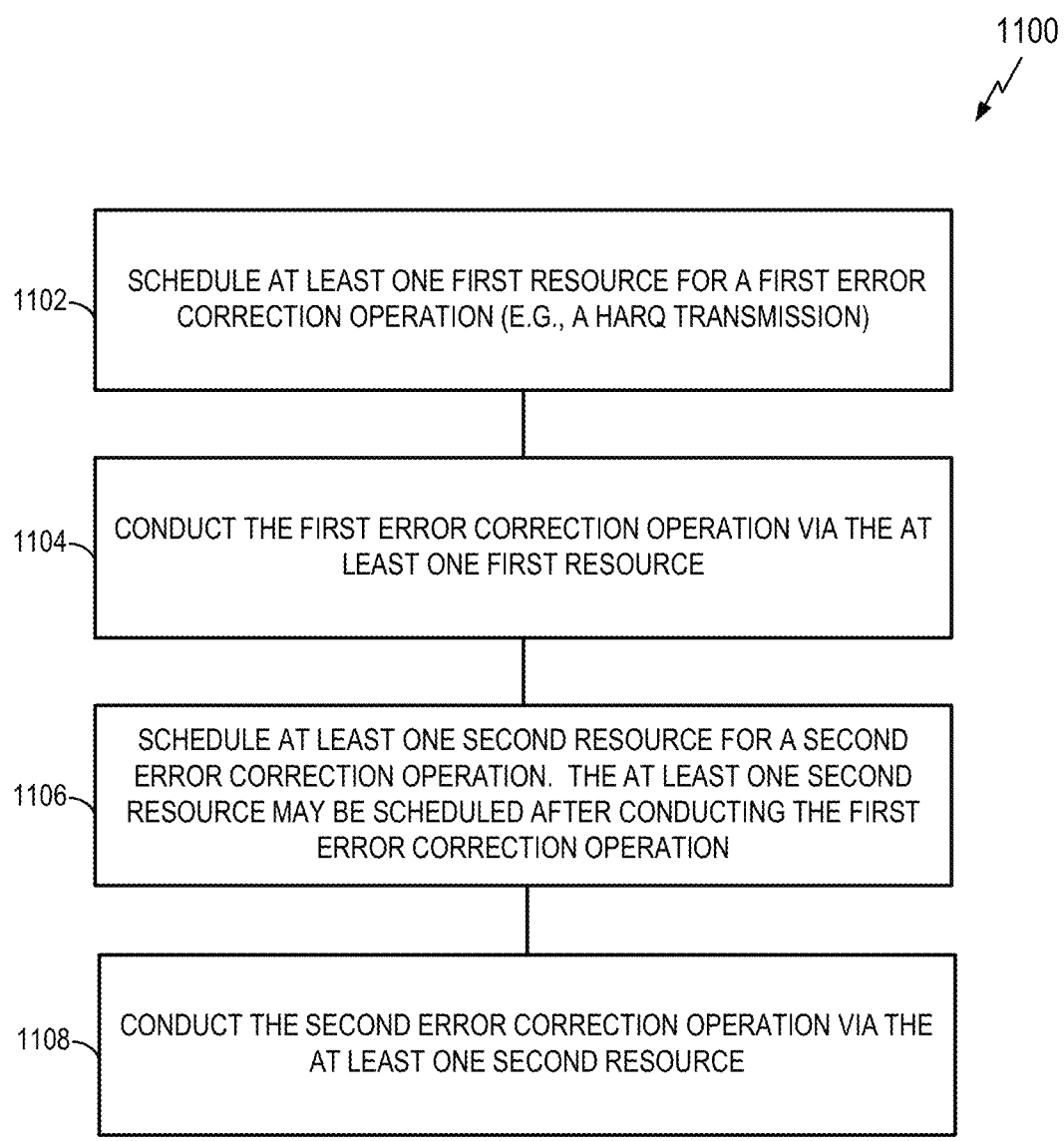
FIG. 11 is a flowchart illustrating an example of a process for independently scheduling HARQ resources and sending HARQ information in accordance with some aspects of the disclosure.

FIG. 11 illustrates a process 1100 for communication in accordance with some aspects of the disclosure. The process 1100 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 1100 may be implemented by any suitable apparatus capable of supporting communication-related operations (e.g., V2X operations).

At block 1102, an apparatus (e.g., a UE) schedules at least one first resource for a first error correction operation (e.g., a HARQ transmission).

At block 1104, the apparatus conducts the first error correction operation via the at least one first resource. In some aspects, the first error correction operation may include (e.g., may be) a first hybrid automatic repeat request (HARQ) transmission; and the second error correction operation may include (e.g., may be) a second HARQ transmission.

At block 1106, the apparatus schedules at least one second resource for a second error correction operation, wherein the at least one second resource is scheduled after conducting the first error correction operation.

At block 1108, the apparatus conducts the second error correction operation via the at least one second resource.

In some aspects, the second error correction operation may include sending a resource contention sequence that includes at least one indication of the at least one second resource scheduled for the second error correction operation. In some aspects, the resource contention sequence may include (e.g., may be) a Listen-Before-Talk (LBT) sequence.

In some aspects, the second error correction operation may include sending at least one control information element that includes at least one indication of the at least one first resource scheduled for the first error correction operation. In some aspects, the at least one control information element may include (e.g., may be) at least one scheduling assignment (SA) symbol.

In some aspects, a process in accordance with the teachings herein may include any combination of the above operations and/or features.

Second Example Apparatus

Figure 12:
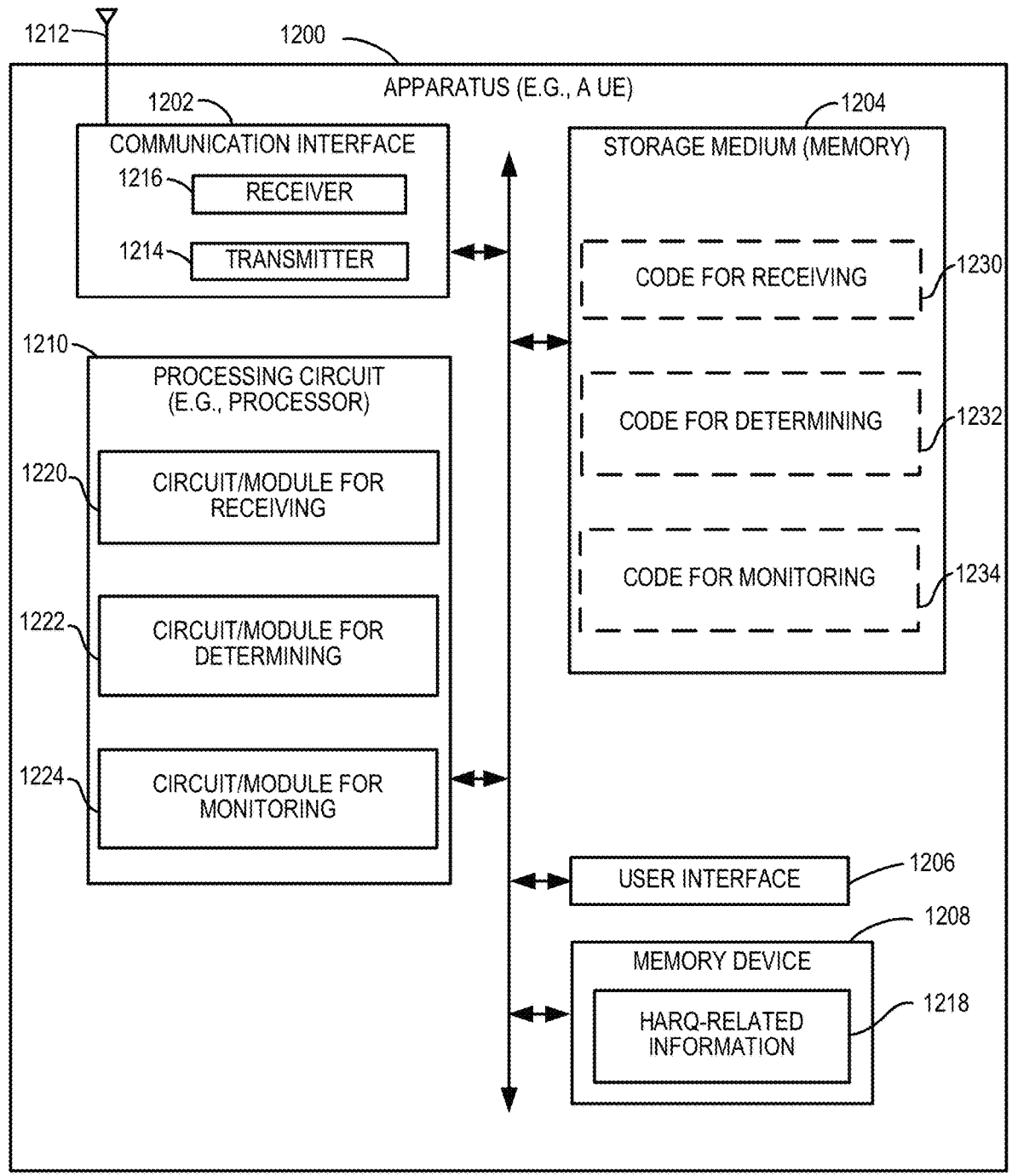
FIG. 12 is a block diagram illustrating another example hardware implementation for an apparatus (e.g., an electronic device) that can support communication in accordance with some aspects of the disclosure.

FIG. 12 illustrates a block diagram of an example hardware implementation of an apparatus 1200 configured to communicate (e.g., receive HARQ transmissions) according to one or more aspects of the disclosure. The apparatus 1200 could embody or be implemented within a UE, a transmit receive point (TRP), an access point, or some other type of device that supports wireless communication as taught herein. In various implementations, the apparatus 1200 could embody or be implemented within an access terminal, a base station, or some other type of device. In various implementations, the apparatus 1200 could embody or be implemented within a mobile phone, a smart phone, a tablet, a portable computer, a personal computer, a sensor, an alarm, a vehicle, a server, a network entity, a machine, an entertainment device, a medical device, or any other electronic device having circuitry.

The apparatus 1200 includes a communication interface 1202 (e.g., at least one transceiver), a storage medium 1204, a user interface 1206, a memory device 1208 (e.g., storing HARQ-related information 1218), and a processing circuit 1210 (e.g., at least one processor). In various implementations, the user interface 1206 may include one or more of: a keypad, a display, a speaker, a microphone, a touchscreen display, of some other circuitry for receiving an input from or sending an output to a user. The communication interface 1202 may be coupled to one or more antennas 1212, and may include a transmitter 1214 and a receiver 1216. In general, the components of FIG. 12 may be similar to corresponding components of the apparatus 700 of FIG. 7.

According to one or more aspects of the disclosure, the processing circuit 1210 may be adapted to perform any or all of the features, processes, functions, operations and/or routines for any or all of the apparatuses described herein. For example, the processing circuit 1210 may be configured to perform any of the steps, functions, and/or processes described with respect to FIGS. 1-6 and 13-16. As used herein, the term "adapted" in relation to the processing circuit 1210 may refer to the processing circuit 1210 being one or more of configured, used, implemented, and/or programmed to perform a particular process, function, operation and/or routine according to various features described herein.

The processing circuit 1210 may be a specialized processor, such as an application specific integrated circuit (ASIC) that serves as a means for (e.g., structure for) carrying out any one of the operations described in conjunction with FIGS. 1-6 and 13-16. The processing circuit 1210 may serve as one example of a means for transmitting and/or a means for receiving. In various implementations, the processing circuit 1210 may provide and/or incorporate, at least in part, the functionality described above for the second device 206 (e.g., the module for managing multiple HARQ transmissions 232) of FIG. 2.

According to at least one example of the apparatus 1200, the processing circuit 1210 may include one or more of a circuit/module for receiving 1220, a circuit/module for determining 1222, or a circuit/module for monitoring 1224. In various implementations, the circuit/module for receiving 1220, the circuit/module for determining 1222, or the circuit/module for monitoring 1224 may provide and/or incorporate, at least in part, the functionality described above for the second device 206 (e.g., the module for managing multiple HARQ transmissions 232) of FIG. 2.

As mentioned above, programming stored by the storage medium 1204, when executed by the processing circuit 1210, causes the processing circuit 1210 to perform one or more of the various functions and/or process operations described herein. For example, the programming may cause the processing circuit 1210 to perform the various functions, steps, and/or processes described herein with respect to FIGS. 1-6 and 13-16 in various implementations. As shown in FIG. 12, the storage medium 1204 may include one or more of code for receiving 1230, code for determining 1232, or code for monitoring 1234. In various implementations, the code for determining that a channel is persistently scheduled 840, the code for receiving 1230, the code for determining 1232, or the code for monitoring 1234 may be executed or otherwise used to provide the functionality described herein for the circuit/module for receiving 1220, the circuit/module for determining 1222, or the circuit/module for monitoring 1224.

The circuit/module for receiving 1220 may include circuitry and/or programming (e.g., code for receiving 1230 stored on the storage medium 1204) adapted to perform several functions relating to, for example, receiving information (e.g., a resource contention sequence, information indicative of a quantity of resource blocks to be received, control information elements, at least one indication of at least one resource, or data). In some scenarios, the circuit/module for receiving 1220 may obtain information (e.g., from the communication interface 1202, the memory device, or some other component of the apparatus 1200) and processes (e.g., decodes) the information. In some scenarios (e.g., if the circuit/module for receiving 1220 is or includes an RF receiver), the circuit/module for receiving 1220 may receive information directly from a device that transmitted the information. In either case, the circuit/module for receiving 1220 may output the obtained information to another component of the apparatus 1200 (e.g., the circuit/module for determining 1222, the memory device 1208, or some other component).

The circuit/module for receiving 1220 (e.g., a means for receiving) may take various forms. In some aspects, the circuit/module for receiving 1220 may correspond to, for example, an interface (e.g., a bus interface, a send/receive interface, or some other type of signal interface), a communication device, a transceiver, a receiver, or some other similar component as discussed herein. In some implementations, the communication interface 1202 includes the circuit/module for receiving 1220 and/or the code for receiving 1230. In some implementations, the circuit/module for receiving 1220 and/or the code for receiving 1230 is configured to control the communication interface 1202 (e.g., a transceiver or a receiver) to receive information.

The circuit/module for determining 1222 may include circuitry and/or programming (e.g., code for determining 1232 stored on the storage medium 1204) adapted to perform several functions relating to, for example, determining information (e.g., a quantity of control information elements). In some aspects, the circuit/module for determining 1222 (e.g., a means for determining) may correspond to, for example, a processing circuit.

Initially, the circuit/module for determining 1222 may obtain information upon which the determination is to be based. For example, the circuit/module for determining 1222 may obtain an indication of a quantity of resource blocks or a resource contention sequence, and then make a determination based on the obtained information (e.g., as discussed herein in conjunction with FIGS. 1-6). The circuit/module for determining 1222 may then output an indication of the determination (e.g., to the circuit/module for receiving 1220, the circuit/module for monitoring 1224, the memory device 1208, or some other component of the apparatus 1200).

The circuit/module for monitoring 1224 may include circuitry and/or programming (e.g., code for monitoring 1234 stored on the storage medium 1204) adapted to perform several functions relating to, for example, monitoring a transmission. In some scenarios, the circuit/module for monitoring 1224 may obtain information (e.g., from the communication interface 1202, the memory device, or some other component of the apparatus 1200) and processes (e.g., decodes) the information. In some scenarios (e.g., if the circuit/module for monitoring 1224 is or includes an RF receiver), the circuit/module for monitoring 1224 may receive information directly from a device that transmitted the information. In either case, the circuit/module for monitoring 1224 may output the obtained information to another component of the apparatus 1200 (e.g., the circuit/module for determining 1222, the memory device 1208, or some other component).

The circuit/module for monitoring 1224 (e.g., a means for receiving) may take various forms. In some aspects, the circuit/module for monitoring 1224 may correspond to, for example, an interface (e.g., a bus interface, a send/receive interface, or some other type of signal interface), a communication device, a transceiver, a receiver, or some other similar component as discussed herein. In some implementations, the communication interface 1202 includes the circuit/module for monitoring 1224 and/or the code for monitoring 1234. In some implementations, the circuit/module for monitoring 1224 and/or the code for monitoring 1234 is configured to control the communication interface 1202 (e.g., a transceiver or a receiver) to receive information.

Fifth Example Process

Figure 13:
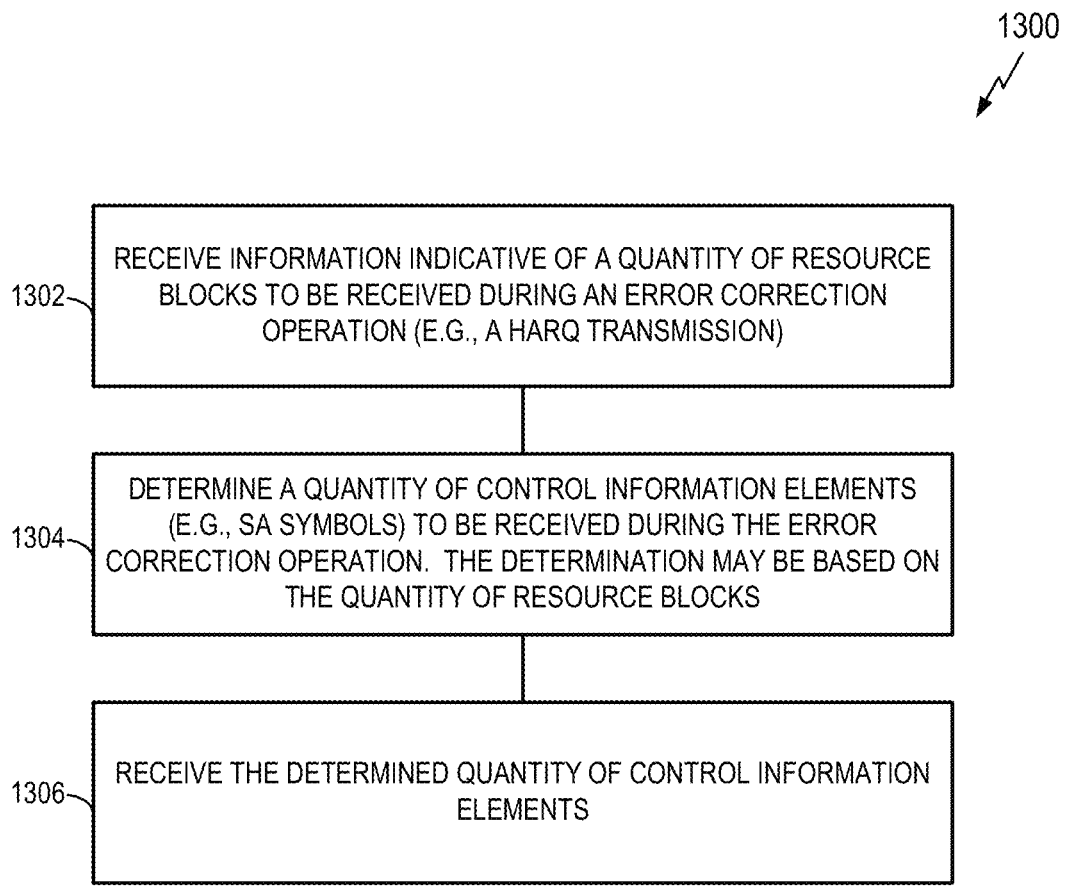
FIG. 13 is a flowchart illustrating an example of a receive-side process for communicating how many SA symbols will be used in accordance with some aspects of the disclosure, where the communicating is based at least in part on a quantity of resource blocks.

FIG. 13 illustrates a process 1300 for communication in accordance with some aspects of the disclosure. The process 1300 may take place within a processing circuit (e.g., the processing circuit 1210 of FIG. 12), which may be located in a UE, an access terminal, a TRP, a base station, or some other suitable apparatus. Of course, in various aspects within the scope of the disclosure, the process 1300 may be implemented by any suitable apparatus capable of supporting communication-related operations (e.g., V2X operations).

At block 1302, an apparatus (e.g., a UE) receives information indicative of a quantity of resource blocks to be received during an error correction operation. In some aspects, the error correction operation may include (e.g., may be) a hybrid automatic repeat request (HARQ) operation (e.g., a HARQ transmission). In some aspects, the information indicative of the quantity of resource blocks may be received via a Listen-Before-Talk (LBT) sequence.

At block 1304, the apparatus determines a quantity of control information elements to be received during the error correction operation, wherein the determination is based on the quantity of resource blocks. In some aspects, the determined quantity of control information elements may include (e.g., may be) a quantity of scheduling assignment (SA) symbols. In some aspects, each control information element may include information for decoding data received during the error correction operation.

In some aspects, the determination of the quantity of control information elements may include: comparing the quantity of resource blocks to a threshold; and identifying the quantity of control information elements to be received based on the comparison. In some aspects, the identification of the quantity of control information elements may include: determining that a first quantity of the control information elements will be received if the quantity of resource blocks exceeds the threshold; or determining that a second quantity of the control information elements will be received if the quantity of resource blocks does not exceed the threshold, wherein the second quantity is less than the first quantity.

At block 1306, the apparatus receives the determined quantity of control information elements. For example, the apparatus may receive the determined quantity of (e.g., one or two) SA symbols.

In some aspects, the error correction operation may include receiving data via a portion of the quantity of resource blocks after receiving the determined quantity of control information elements.

In some aspects, a process in accordance with the teachings herein may include any combination of the above operations and/or features.

Sixth Example Process

Figure 14:
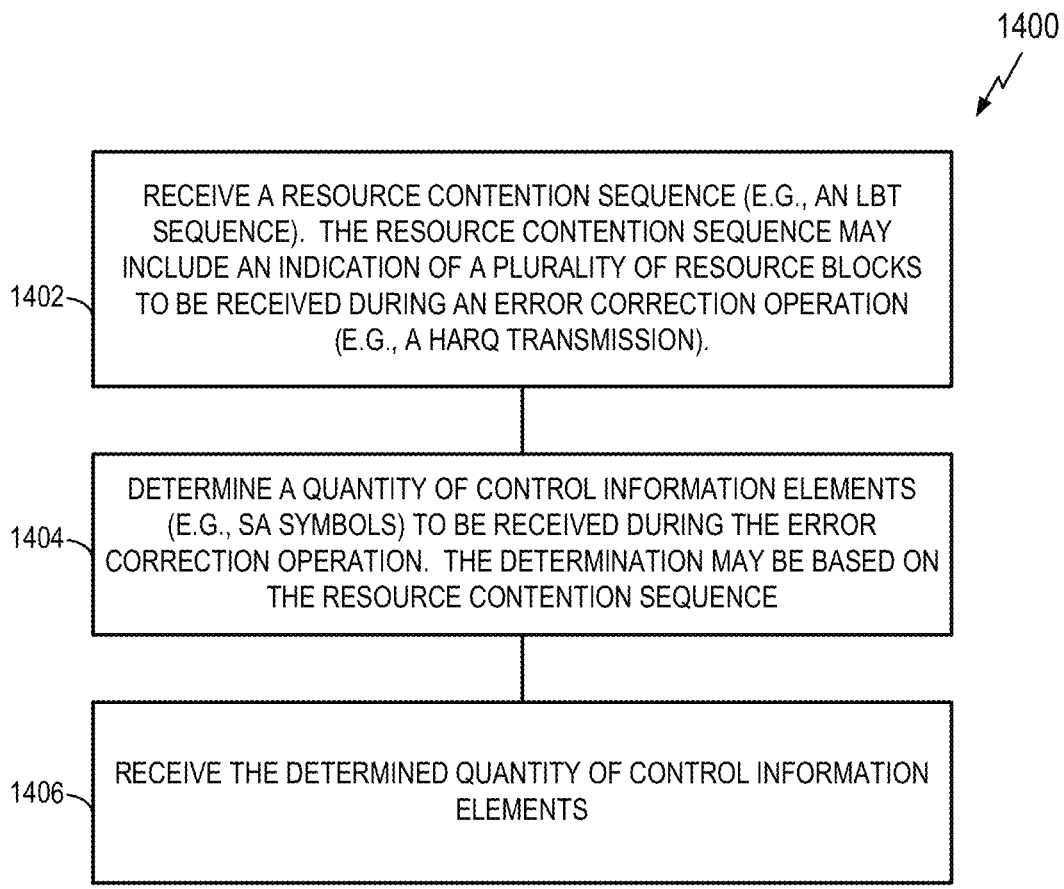
FIG. 14 is a flowchart illustrating an example of a receive-side process for communicating how many SA symbols will be used in accordance with some aspects of the disclosure, where the communicating is based at least in part on a resource contention sequence.

FIG. 14 illustrates a process 1400 for communication in accordance with some aspects of the disclosure. The process 1400 may take place within a processing circuit (e.g., the processing circuit 1210 of FIG. 12), which may be located in a UE, an access terminal, a TRP, a base station, or some other suitable apparatus. Of course, in various aspects within the scope of the disclosure, the process 1400 may be implemented by any suitable apparatus capable of supporting communication-related operations (e.g., V2X operations).

At block 1402, an apparatus (e.g., a UE) receives a resource contention sequence (e.g., an LBT sequence). In some aspects, the resource contention sequence may include an indication of a plurality of resource blocks to be received during an error correction operation. In some aspects, the resource contention sequence may include (e.g., may be) a Listen-Before-Talk (LBT) sequence. In some aspects, the error correction operation may include (e.g., may be) a hybrid automatic repeat request (HARQ) operation.

At block 1404, the apparatus determines a quantity of control information elements (e.g., SA symbols) to be received during the error correction operation. In some aspects, the determination of block 1404 may be based on the resource contention sequence. In some aspects, the determined quantity of control information elements may include (e.g., may be) a quantity of scheduling assignment (SA) symbols. In some aspects, each control information element may include information for decoding data received during the error correction operation.

In some aspects, the determination of the quantity of control information elements may include: comparing the resource contention sequence to a mapping of resource contention sequences, wherein the mapping maps different sets of resource contention sequences to different quantities of control information elements; and identifying the quantity of control information elements to be received based on the comparison. In some aspects, the identification of the quantity of control information elements may include: determining that a first quantity of the control information elements will be received if the resource contention sequence maps to a first set of the sets of resource contention sequences; or determining that a second quantity of the control information elements will be received if the resource contention sequence maps to a second set of the sets of resource contention sequences.

At block 1406, the apparatus receives the determined quantity of control information elements.

In some aspects, the error correction operation may include receiving data via a portion of the resource blocks after receiving the determined quantity of control information elements.

In some aspects, a process in accordance with the teachings herein may include any combination of the above operations and/or features.

Seventh Example Process

Figure 15:
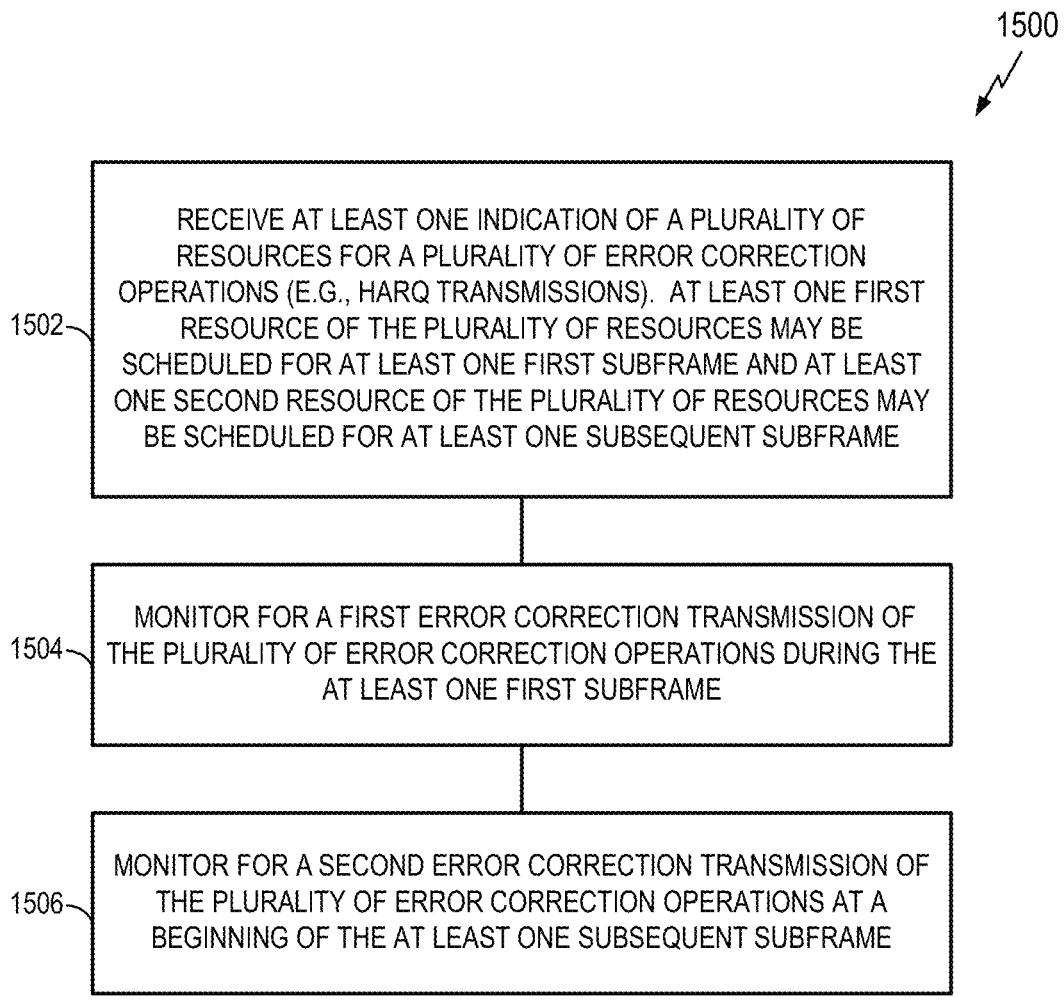
FIG. 15 is a flowchart illustrating an example of a process for pre-reservation of multiple HARQ resources and receiving HARQ information in accordance with some aspects of the disclosure.

FIG. 15 illustrates a process 1500 for communication in accordance with some aspects of the disclosure. The process 1500 may take place within a processing circuit (e.g., the processing circuit 1210 of FIG. 12), which may be located in a UE, an access terminal, a TRP, a base station, or some other suitable apparatus. Of course, in various aspects within the scope of the disclosure, the process 1500 may be implemented by any suitable apparatus capable of supporting communication-related operations (e.g., V2X operations).

At block 1502, an apparatus (e.g., a UE) receives at least one indication of a plurality of resources for a plurality of error correction operations. In some aspects, at least one first resource of the plurality of resources may be scheduled for at least one first subframe and at least one second resource of the plurality of resources may be scheduled for at least one subsequent subframe. In some aspects, the error correction operations may include (e.g., may be) hybrid automatic repeat request (HARQ) transmissions.

In some aspects, one or more of the at least one indication may be received via a resource contention sequence. In some aspects, the resource contention sequence may include (e.g., may be) a Listen-Before-Talk (LBT) sequence.

In some aspects, one or more of the at least one indication may be received via at least one control information element. In some aspects, the at least one control information element may include (e.g., may be) at least one scheduling assignment (SA) symbol.

At block 1504, the apparatus monitors for a first error correction transmission of the plurality of error correction operations during the at least one first subframe.

At block 1506, the apparatus monitors for a second error correction transmission of the plurality of error correction operations at a beginning of the at least one subsequent subframe.

In some aspects, a process in accordance with the teachings herein may include any combination of the above operations and/or features.

Eighth Example Process

Figure 16:
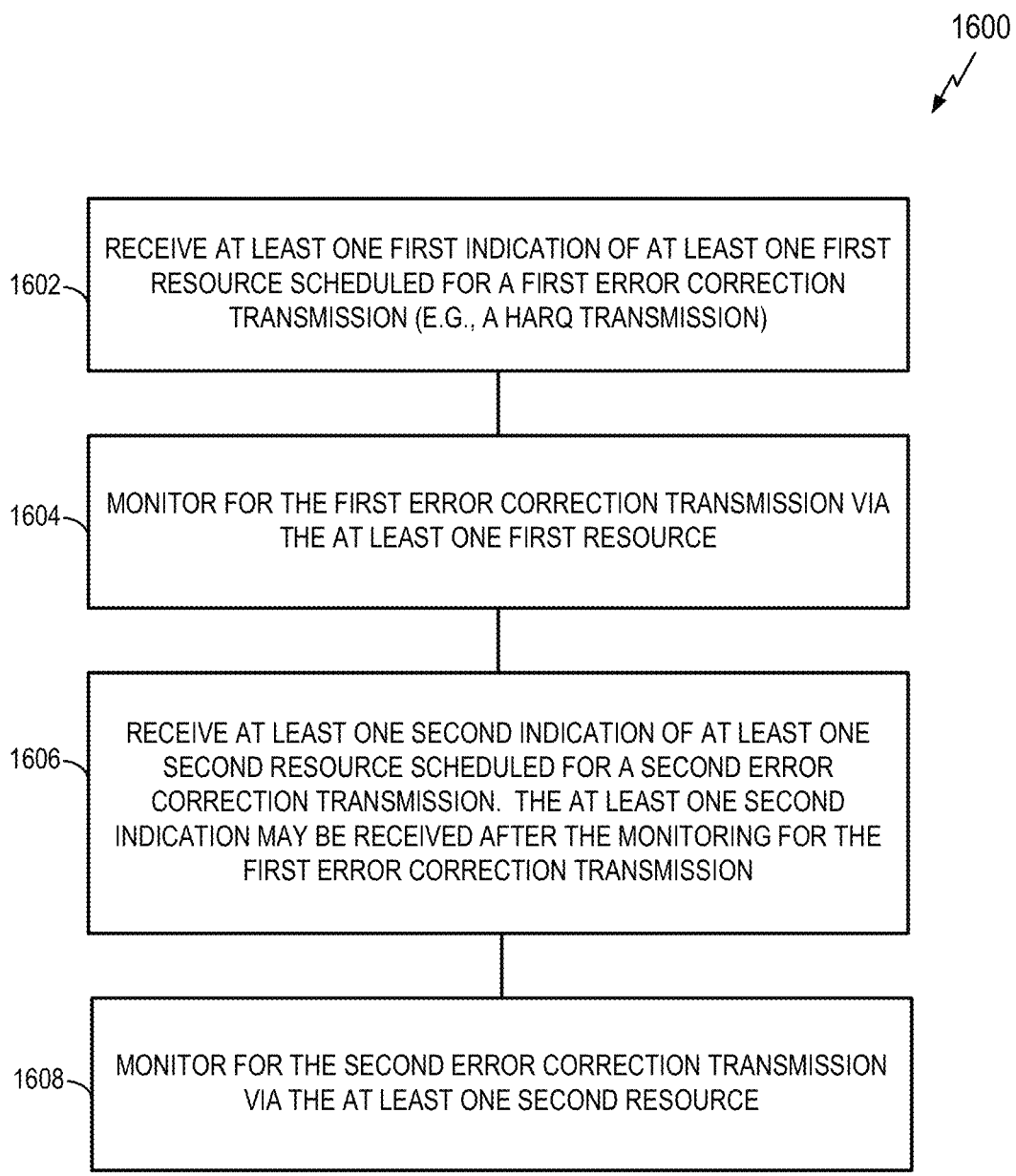
FIG. 16 is a flowchart illustrating an example of a process for independently scheduling HARQ resources and receiving HARQ information in accordance with some aspects of the disclosure.

FIG. 16 illustrates a process 1600 for communication in accordance with some aspects of the disclosure. The process 1600 may take place within a processing circuit (e.g., the processing circuit 1210 of FIG. 12), which may be located in a UE, an access terminal, a TRP, a base station, or some other suitable apparatus. Of course, in various aspects within the scope of the disclosure, the process 1600 may be implemented by any suitable apparatus capable of supporting communication-related operations (e.g., V2X operations).

At block 1602, an apparatus (e.g., a UE) receives at least one first indication of at least one first resource scheduled for a first error correction transmission (e.g., a HARQ transmission).

At block 1604, the apparatus monitors for the first error correction transmission via the at least one first resource. In some aspects, the first error correction transmission may include (e.g., may be) a first hybrid automatic repeat request (HARQ) transmission.

At block 1606, the apparatus receives at least one second indication of at least one second resource scheduled for a second error correction transmission, wherein the at least one second indication is received after the monitoring for the first error correction transmission.

In some aspects, the at least one second indication may be received via a resource contention sequence. In some aspects, the resource contention sequence may include (e.g., may be) a Listen-Before-Talk (LBT) sequence.

At block 1608, the apparatus monitors for the second error correction transmission via the at least one second resource. In some aspects, the second error correction transmission may include (e.g., may be) a second HARQ transmission.

In some aspects, the second error correction transmission may include at least one control information element that includes at least one indication of the at least one first resource scheduled for the first error correction transmission. In some aspects, the at least one control information element may include (e.g., may be) at least one scheduling assignment (SA) symbol.

In some aspects, a process in accordance with the teachings herein may include any combination of the above operations and/or features.

Additional Aspects

The disclosure relates in some aspects to a method of communication for an apparatus. The method includes:

scheduling a plurality of resources for a plurality of error correction operations, wherein at least one resource of the plurality of resources is scheduled for at least one subsequent subframe; conducting a first error correction operation of the plurality of error correction operations, wherein the first error correction operation is conducted via a first resource of the plurality of resources; and conducting a second error correction operation of the plurality of error correction operations, wherein the second error correction operation is conducted via a second resource of the plurality of resources. In some aspects, the error correction operations comprise hybrid automatic repeat request (HARQ) transmissions. In some aspects, the first error correction operation includes sending a Listen-Before-Talk (LBT) sequence. In some aspects, the first error correction operation includes: sending a resource contention sequence comprising at least one indication of at least one other resource of the plurality of resources scheduled for a current subframe. In some aspects, the resource contention sequence includes a Listen-Before-Talk (LBT) sequence. In some aspects, the first error correction operation includes: sending at least one control information element comprising at least one indication of the at least one resource scheduled for the at least one subsequent subframe. In some aspects, the at least one control information element includes at least one scheduling assignment (SA) symbol. In some aspects, each SA symbol includes information for decoding data sent via the error correction operations. In some aspects, the second error correction operation includes sending information at a beginning of a scheduled subframe. In some aspects, the second error correction operation includes: sending at least one control information element comprising at least one indication of the at least one resource scheduled for the at least one subsequent subframe. In some aspects, the at least one control information element includes at least one scheduling assignment (SA) symbol. In some aspects, the error correction operations comprise hybrid automatic repeat request (HARQ) transmissions. In some aspects, the first error correction operation includes sending a Listen-Before-Talk (LBT) sequence. In some aspects, the first error correction operation includes: sending a resource contention sequence comprising at least one indication of at least one other resource of the plurality of resources scheduled for a current subframe. In some aspects, the resource contention sequence includes a Listen-Before-Talk (LBT) sequence. In some aspects, the first error correction operation includes: sending at least one control information element comprising at least one indication of the at least one resource scheduled for the at least one subsequent subframe. In some aspects, the at least one control information element includes at least one scheduling assignment (SA) symbol. In some aspects, each SA symbol includes information for decoding data sent via the error correction operations. In some aspects, the second error correction operation includes sending information at a beginning of a scheduled subframe. In some aspects, the second error correction operation includes: sending at least one control information element comprising at least one indication of the at least one resource scheduled for the at least one subsequent subframe. In some aspects, the at least one control information element includes at least one scheduling assignment (SA) symbol.

The disclosure relates in some aspects to an apparatus for communication that includes a memory and a processor coupled to the memory. The processor and the memory are configured to: schedule a plurality of resources for a plurality of error correction operations, wherein at least one resource of the plurality of resources is scheduled for at least one subsequent subframe; conduct a first error correction operation of the plurality of error correction operations, wherein the first error correction operation is conducted via a first resource of the plurality of resources; and conduct a second error correction operation of the plurality of error correction operations, wherein the second error correction operation is conducted via a second resource of the plurality of resources.

The disclosure relates in some aspects to an apparatus for communication. The apparatus includes: means for scheduling a plurality of resources for a plurality of error correction operations, wherein at least one resource of the plurality of resources is scheduled for at least one subsequent subframe; means for conducting a first error correction operation of the plurality of error correction operations, wherein the first error correction operation is conducted via a first resource of the plurality of resources; and means for conducting a second error correction operation of the plurality of error correction operations, wherein the second error correction operation is conducted via a second resource of the plurality of resources. In some aspects, the error correction operations comprise hybrid automatic repeat request (HARQ) transmissions. In some aspects, the first error correction operation includes sending a Listen-Before-Talk (LBT) sequence. In some aspects, the first error correction operation includes: sending a resource contention sequence comprising at least one indication of at least one other resource of the plurality of resources scheduled for a current subframe. In some aspects, the resource contention sequence includes a Listen-Before-Talk (LBT) sequence. In some aspects, the first error correction operation includes: sending at least one control information element comprising at least one indication of the at least one resource scheduled for the at least one subsequent subframe. In some aspects, the at least one control information element includes at least one scheduling assignment (SA) symbol. In some aspects, each SA symbol includes information for decoding data sent via the error correction operations. In some aspects, the second error correction operation includes sending information at a beginning of a scheduled subframe. In some aspects, the second error correction operation includes: sending at least one control information element comprising at least one indication of the at least one resource scheduled for the at least one subsequent subframe. In some aspects, the at least one control information element includes at least one scheduling assignment (SA) symbol.

The disclosure relates in some aspects to a non-transitory computer-readable medium. The medium stores computer-executable code, including code to: schedule a plurality of resources for a plurality of error correction operations, wherein at least one resource of the plurality of resources is scheduled for at least one subsequent subframe; conduct a first error correction operation of the plurality of error correction operations, wherein the first error correction operation is conducted via a first resource of the plurality of resources; and conduct a second error correction operation of the plurality of error correction operations, wherein the second error correction operation is conducted via a second resource of the plurality of resources.

The disclosure relates in some aspects to a method of communication for an apparatus. The method includes: receiving at least one indication of a plurality of resources for a plurality of error correction operations, wherein at least one first resource of the plurality of resources is scheduled for at least one first subframe and at least one second resource of the plurality of resources is scheduled for at least one subsequent subframe; monitoring for a first error correction transmission of the plurality of error correction operations during the at least one first subframe; and monitoring for a second error correction transmission of the plurality of error correction operations at a beginning of the at least one subsequent subframe. In some aspects, the error correction operations comprise hybrid automatic repeat request (HARQ) transmissions. In some aspects, one or more of the at least one indication is received via a resource contention sequence. In some aspects, the resource contention sequence includes a Listen-Before-Talk (LBT) sequence. In some aspects, one or more of the at least one indication is received via at least one control information element. In some aspects, the at least one control information element includes at least one scheduling assignment (SA) symbol.

The disclosure relates in some aspects to an apparatus for communication that includes a memory and a processor coupled to the memory. The processor and the memory are configured to: receive at least one indication of a plurality of resources for a plurality of error correction operations, wherein at least one first resource of the plurality of resources is scheduled for at least one first subframe and at least one second resource of the plurality of resources is scheduled for at least one subsequent subframe; monitor for a first error correction transmission of the plurality of error correction operations during the at least one first subframe; and monitor for a second error correction transmission of the plurality of error correction operations at a beginning of the at least one subsequent subframe. In some aspects, the error correction operations comprise hybrid automatic repeat request (HARQ) transmissions. In some aspects, one or more of the at least one indication is received via a resource contention sequence. In some aspects, the resource contention sequence includes a Listen-Before-Talk (LBT) sequence. In some aspects, one or more of the at least one indication is received via at least one control information element. In some aspects, the at least one control information element includes at least one scheduling assignment (SA) symbol.

The disclosure relates in some aspects to an apparatus for communication. The apparatus includes: means for receiving at least one indication of a plurality of resources for a plurality of error correction operations, wherein at least one first resource of the plurality of resources is scheduled for at least one first subframe and at least one second resource of the plurality of resources is scheduled for at least one subsequent subframe; means for monitoring for a first error correction transmission of the plurality of error correction operations during the at least one first subframe; and means for monitoring for a second error correction transmission of the plurality of error correction operations at a beginning of the at least one subsequent subframe. In some aspects, the error correction operations comprise hybrid automatic repeat request (HARQ) transmissions. In some aspects, one or more of the at least one indication is received via a resource contention sequence. In some aspects, the resource contention sequence includes a Listen-Before-Talk (LBT) sequence. In some aspects, one or more of the at least one indication is received via at least one control information element. In some aspects, the at least one control information element includes at least one scheduling assignment (SA) symbol.

The disclosure relates in some aspects to a non-transitory computer-readable medium. The medium stores computer-executable code, including code to: receive at least one indication of a plurality of resources for a plurality of error correction operations, wherein at least one first resource of the plurality of resources is scheduled for at least one first subframe and at least one second resource of the plurality of resources is scheduled for at least one subsequent subframe; monitor for a first error correction transmission of the plurality of error correction operations during the at least one first subframe; and monitor for a second error correction transmission of the plurality of error correction operations at a beginning of the at least one subsequent subframe.

The disclosure relates in some aspects to a method of communication for an apparatus. The method includes: scheduling at least one first resource for a first error correction operation; conducting the first error correction operation via the at least one first resource; scheduling at least one second resource for a second error correction operation, wherein the at least one second resource is scheduled after conducting the first error correction operation; and conducting the second error correction operation via the at least one second resource. In some aspects, the first error correction operation includes a first hybrid automatic repeat request (HARQ) transmission; and the second error correction operation includes a second HARQ transmission. In some aspects, the second error correction operation includes: sending a resource contention sequence comprising at least one indication of the at least one second resource scheduled for the second error correction operation. In some aspects, the resource contention sequence includes a Listen-Before-Talk (LBT) sequence. In some aspects, the second error correction operation includes: sending at least one control information element comprising at least one indication of the at least one first resource scheduled for the first error correction operation. In some aspects, the at least one control information element includes at least one scheduling assignment (SA) symbol.

The disclosure relates in some aspects to an apparatus for communication that includes a memory and a processor coupled to the memory. The processor and the memory are configured to: schedule at least one first resource for a first error correction operation; conduct the first error correction operation via the at least one first resource; scheduling at least one second resource for a second error correction operation, wherein the at least one second resource is scheduled after conducting the first error correction operation; and conduct the second error correction operation via the at least one second resource. In some aspects, the first error correction operation includes a first hybrid automatic repeat request (HARQ) transmission; and the second error correction operation includes a second HARQ transmission. In some aspects, the second error correction operation includes: sending a resource contention sequence comprising at least one indication of the at least one second resource scheduled for the second error correction operation. In some aspects, the resource contention sequence includes a Listen-Before-Talk (LBT) sequence. In some aspects, the second error correction operation includes: sending at least one control information element comprising at least one indication of the at least one first resource scheduled for the first error correction operation. In some aspects, the at least one control information element includes at least one scheduling assignment (SA) symbol.

The disclosure relates in some aspects to an apparatus for communication. The apparatus includes: means for scheduling at least one first resource for a first error correction operation; means for conducting the first error correction operation via the at least one first resource; scheduling at least one second resource for a second error correction operation, wherein the at least one second resource is scheduled after conducting the first error correction operation; and means for conducting the second error correction operation via the at least one second resource. In some aspects, the first error correction operation includes a first hybrid automatic repeat request (HARQ) transmission; and the second error correction operation includes a second HARQ transmission. In some aspects, the second error correction operation includes: sending a resource contention sequence comprising at least one indication of the at least one second resource scheduled for the second error correction operation. In some aspects, the resource contention sequence includes a Listen-Before-Talk (LBT) sequence. In some aspects, the second error correction operation includes: sending at least one control information element comprising at least one indication of the at least one first resource scheduled for the first error correction operation. In some aspects, the at least one control information element includes at least one scheduling assignment (SA) symbol.

The disclosure relates in some aspects to a non-transitory computer-readable medium. The medium stores computer-executable code, including code to: schedule at least one first resource for a first error correction operation; conduct the first error correction operation via the at least one first resource; scheduling at least one second resource for a second error correction operation, wherein the at least one second resource is scheduled after conducting the first error correction operation; and conduct the second error correction operation via the at least one second resource.

The disclosure relates in some aspects to a method of communication for an apparatus. The method includes: receiving at least one first indication of at least one first resource scheduled for a first error correction transmission; monitoring for the first error correction transmission via the at least one first resource; receiving at least one second indication of at least one second resource scheduled for a second error correction transmission, wherein the at least one second indication is received after the monitoring for the first error correction transmission; and monitoring for the second error correction transmission via the at least one second resource. In some aspects, the first error correction transmission includes a first hybrid automatic repeat request (HARQ) transmission; and the second error correction transmission includes a second HARQ transmission. In some aspects, the at least one second indication is received via a resource contention sequence. In some aspects, the resource contention sequence includes a Listen-Before-Talk (LBT) sequence. In some aspects, the second error correction transmission includes: at least one control information element comprising at least one indication of the at least one first resource scheduled for the first error correction transmission. In some aspects, the at least one control information element includes at least one scheduling assignment (SA) symbol.

The disclosure relates in some aspects to an apparatus for communication that includes a memory and a processor coupled to the memory. The processor and the memory are configured to: receive at least one first indication of at least one first resource scheduled for a first error correction transmission; monitor for the first error correction transmission via the at least one first resource; receive at least one second indication of at least one second resource scheduled for a second error correction transmission, wherein the at least one second indication is received after the monitoring for the first error correction transmission; and monitor for the second error correction transmission via the at least one second resource. In some aspects, the first error correction transmission includes a first hybrid automatic repeat request (HARQ) transmission; and the second error correction transmission includes a second HARQ transmission. In some aspects, the at least one second indication is received via a resource contention sequence. In some aspects, the resource contention sequence includes a Listen-Before-Talk (LBT) sequence. In some aspects, the second error correction transmission includes: at least one control information element comprising at least one indication of the at least one first resource scheduled for the first error correction transmission. In some aspects, the at least one control information element includes at least one scheduling assignment (SA) symbol.

The disclosure relates in some aspects to an apparatus for communication. The apparatus includes: means for receiving at least one first indication of at least one first resource scheduled for a first error correction transmission; means for monitoring for the first error correction transmission via the at least one first resource; means for receiving at least one second indication of at least one second resource scheduled for a second error correction transmission, wherein the at least one second indication is received after the monitoring for the first error correction transmission; and means for monitoring for the second error correction transmission via the at least one second resource. In some aspects, the first error correction transmission includes a first hybrid automatic repeat request (HARQ) transmission; and the second error correction transmission includes a second HARQ transmission. In some aspects, the at least one second indication is received via a resource contention sequence. In some aspects, the resource contention sequence includes a Listen-Before-Talk (LBT) sequence. In some aspects, the second error correction transmission includes: at least one control information element comprising at least one indication of the at least one first resource scheduled for the first error correction transmission. In some aspects, the at least one control information element includes at least one scheduling assignment (SA) symbol.

The disclosure relates in some aspects to a non-transitory computer-readable medium. The medium stores computer-executable code, including code to: receive at least one first indication of at least one first resource scheduled for a first error correction transmission; monitor for the first error correction transmission via the at least one first resource; receive at least one second indication of at least one second resource scheduled for a second error correction transmission, wherein the at least one second indication is received after the monitoring for the first error correction transmission; and monitor for the second error correction transmission via the at least one second resource.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV- DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
   determining a quantity of resource blocks to be used for a hybrid automatic repeat request (HARQ) transmission;
   selecting a quantity of scheduling assignment (SA) symbols to be used for the HARQ transmission, wherein the selection of the quantity of SA symbols to be used for the HARQ transmission is based on the determined quantity of resource blocks to be used for the HARQ transmission;
   sending information indicative of the determined quantity of resource blocks to be used for the HARQ transmission; and
   sending the selected quantity of SA symbols.

2. The method of claim 1, wherein the information indicative of the determined quantity of resource blocks is sent via a Listen-Before-Talk (LBT) sequence.

3. The method of claim 1, wherein each SA symbol comprises information for decoding data sent during the HARQ transmission.

4. The method of claim 1, wherein the selection of the quantity of SA symbols comprises:
   comparing the determined quantity of resource blocks to a threshold; and
   identifying the quantity of SA symbols to be used based on the comparison.

5. The method of claim 4, wherein the identification of the quantity of SA symbols comprises:
   electing to use a first quantity of the SA symbols if the determined quantity of resource blocks exceeds the threshold; or
   electing to use a second quantity of the SA symbols if the determined quantity of resource blocks does not exceed the threshold, wherein the second quantity is less than the first quantity.

6. The method of claim 1, wherein the HARQ transmission comprises:
   sending data via a portion of the determined quantity of resource blocks.

7. A method of communication for an apparatus, comprising:
   receiving information indicative of a quantity of resource blocks to be received during a hybrid automatic repeat request (HARQ) operation;
   determining a quantity of scheduling assignment (SA) symbols to be received during the HARQ operation, wherein the determination of the quantity of SA symbols to be received during the HARQ operation is based on the quantity of resource blocks to be received during the HARQ operation; and
   receiving the determined quantity of SA symbols.

8. The method of claim 7, wherein the information indicative of the quantity of resource blocks is received via a Listen-Before-Talk (LBT) sequence.

9. The method of claim 7, wherein the determination of the quantity of SA symbols comprises:
   comparing the quantity of resource blocks to a threshold; and
   identifying the quantity of SA symbols to be received based on the comparison.

10. The method of claim 9, wherein the identification of the quantity of SA symbols comprises:
    determining that a first quantity of the SA symbols will be received if the quantity of resource blocks exceeds the threshold; or
    determining that a second quantity of the SA symbols will be received if the quantity of resource blocks does not exceed the threshold, wherein the second quantity is less than the first quantity.

11. The method of claim 7, wherein HARQ operation comprises:
    receiving data via a portion of the quantity of resource blocks after receiving the determined quantity of SA symbols.

12. A method of communication for an apparatus, comprising:
    determining a quantity of scheduling assignment (SA) symbols to be used for a hybrid automatic repeat request (HARQ) transmission;
    selecting a resource contention sequence to be used for the HARQ transmission from a plurality of different resource contention sequences, wherein the selection of the resource contention sequence to be used for the HARQ transmission is based on the determined quantity of SA symbols to be used for the HARQ transmission; and
    sending the resource contention sequence, wherein the resource contention sequence comprises an indication of a plurality of resource blocks used for the HARQ transmission.

13. The method of claim 12, further comprising:
    sending the determined quantity of SA symbols after sending the resource contention sequence.

14. The method of claim 12, wherein the selected resource contention sequence comprises a Listen-Before-Talk (LBT) sequence.

15. The method of claim 12, wherein each SA symbol comprises information for decoding data sent during the HARQ transmission.

16. The method of claim 12, wherein the selection of the resource contention sequence comprises:
    comparing the determined quantity of SA symbols to a threshold; and identifying the resource contention sequence to be used based on the comparison.

17. The method of claim 16, wherein the identification of the resource contention sequence comprises:
    electing to use a resource contention sequence from a first set of resource contention sequences if the determined quantity of SA symbols exceeds the threshold; or
    electing to use a resource contention sequence from a second set of resource contention sequences if the determined quantity of SA symbols does not exceed the threshold.

18. The method of claim 12, wherein the HARQ transmission comprises:
    sending data via a portion of the resource blocks after sending the resource contention sequence.

19. A method of communication for an apparatus, comprising:
    receiving a resource contention sequence, wherein the resource contention sequence comprises an indication of a plurality of resource blocks to be received during a hybrid automatic repeat request (HARQ) operation;
    identifying the resource contention sequence from a plurality of different resource contention sequences;
    determining a quantity of scheduling assignment (SA) symbols to be received during the HARQ operation, wherein the determination of the quantity of SA symbols to be received during the HARQ operation is based on the identification of the resource contention sequence; and
    receiving the determined quantity of SA symbols.

20. The method of claim 19, wherein the resource contention sequence comprises a Listen-Before-Talk (LBT) sequence.

21. The method of claim 19, wherein the determination of the quantity of SA symbols comprises:
    comparing the resource contention sequence to a mapping of resource contention sequences, wherein the mapping maps different sets of resource contention sequences to different quantities of SA symbols; and
    identifying the quantity of SA symbols to be received based on the comparison.

22. The method of claim 21, wherein the identification of the quantity of SA symbols comprises:
    determining that a first quantity of the SA symbols will be received if the resource contention sequence maps to a first set of the sets of resource contention sequences; or
    determining that a second quantity of the SA symbols will be received if the resource contention sequence maps to a second set of the sets of resource contention sequences.

23. The method of claim 19, wherein the HARQ operation comprises:
    receiving data via a portion of the resource blocks after receiving the determined quantity of SA symbols.

* * * * *